United States Patent [19]
Fukawa

[11] Patent Number: 6,167,346
[45] Date of Patent: *Dec. 26, 2000

[54] NAVIGATION SYSTEM FOR GUIDING A MOBILE BODY BACK AND FORTH ALONG THE SAME ROUTE BETWEEN TWO POINTS

[75] Inventor: Yasurou Fukawa, Hiratuka, Japan

[73] Assignee: Any Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/005,505

[22] Filed: Jan. 12, 1998

[30] Foreign Application Priority Data

Jan. 31, 1997 [JP] Japan ..................................... 9-018213

[51] Int. Cl.[7] .................................................. G01C 21/00
[52] U.S. Cl. ...................................... 701/208; 342/357.13
[58] Field of Search .................................... 701/208, 209, 701/213, 216; 342/357.08, 357.14, 357.13, 357.09

[56] References Cited

U.S. PATENT DOCUMENTS

| | | | |
|---|---|---|---|
| 4,242,731 | 12/1980 | Mizote et al. | 701/209 |
| 4,563,685 | 1/1986 | Matsumoto et al. | 340/995 |
| 5,257,195 | 10/1993 | Hirata | 342/357.14 |
| 5,262,774 | 11/1993 | Kuwahara et al. | 340/988 |
| 5,334,986 | 8/1994 | Fernhout | 342/357.14 |
| 5,543,802 | 8/1996 | Villeviellie et al. | 342/443 |
| 5,559,520 | 9/1996 | Barzegar et al. | 342/357.1 |
| 5,722,083 | 2/1998 | Konig | 455/517 |

FOREIGN PATENT DOCUMENTS

| | | |
|---|---|---|
| 8005721 | 1/1996 | Japan. |
| 8082527 | 3/1996 | Japan. |
| 8327376 | 12/1996 | Japan. |
| 9005099 | 1/1997 | Japan. |

Primary Examiner—Gregory C. Issing

[57] ABSTRACT

In a navigation system, a controller includes a time selecting circuit for selecting times output from a timepiece in response to a signal representing a time interval from an operation unit, a satellite navigation position detecting circuit for receiving a radio wave at the times selected by the time selecting circuit from a Global Positioning System (GPS) receiver, and for determining the position of a mobile body on the basis of the radio wave, and an autonomous navigation position detecting circuit for receiving the output of both a distance sensor and an azimuth sensor which are synchronous to the times selected, for determining a distance and an azimuth based on the outputs of the distance and azimuth sensors, for determining a track of movement of the mobile body based on the distance and azimuth, and for adding the track to the start point of the mobile body to thereby produce the current position of the mobile body.

10 Claims, 25 Drawing Sheets

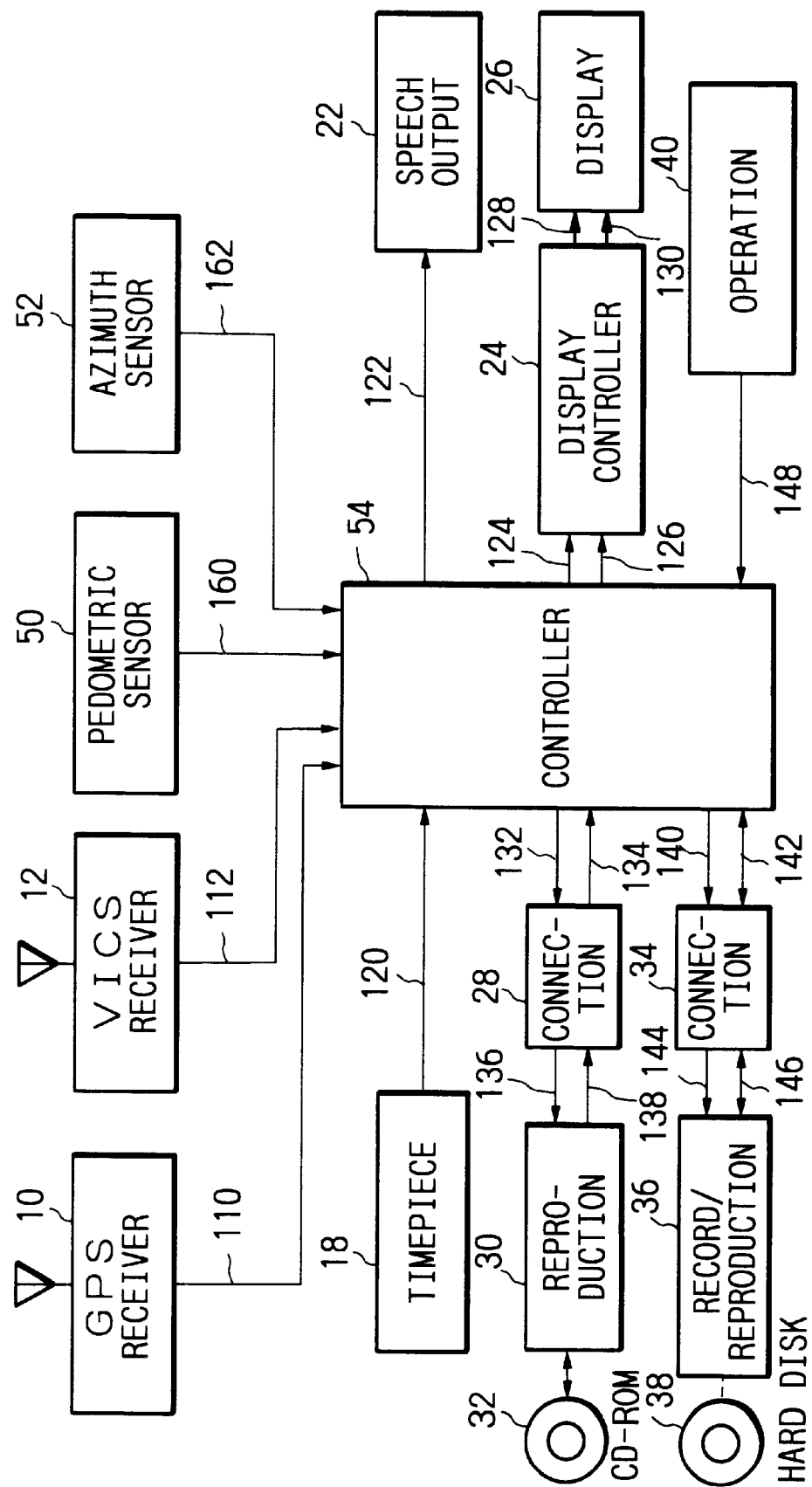

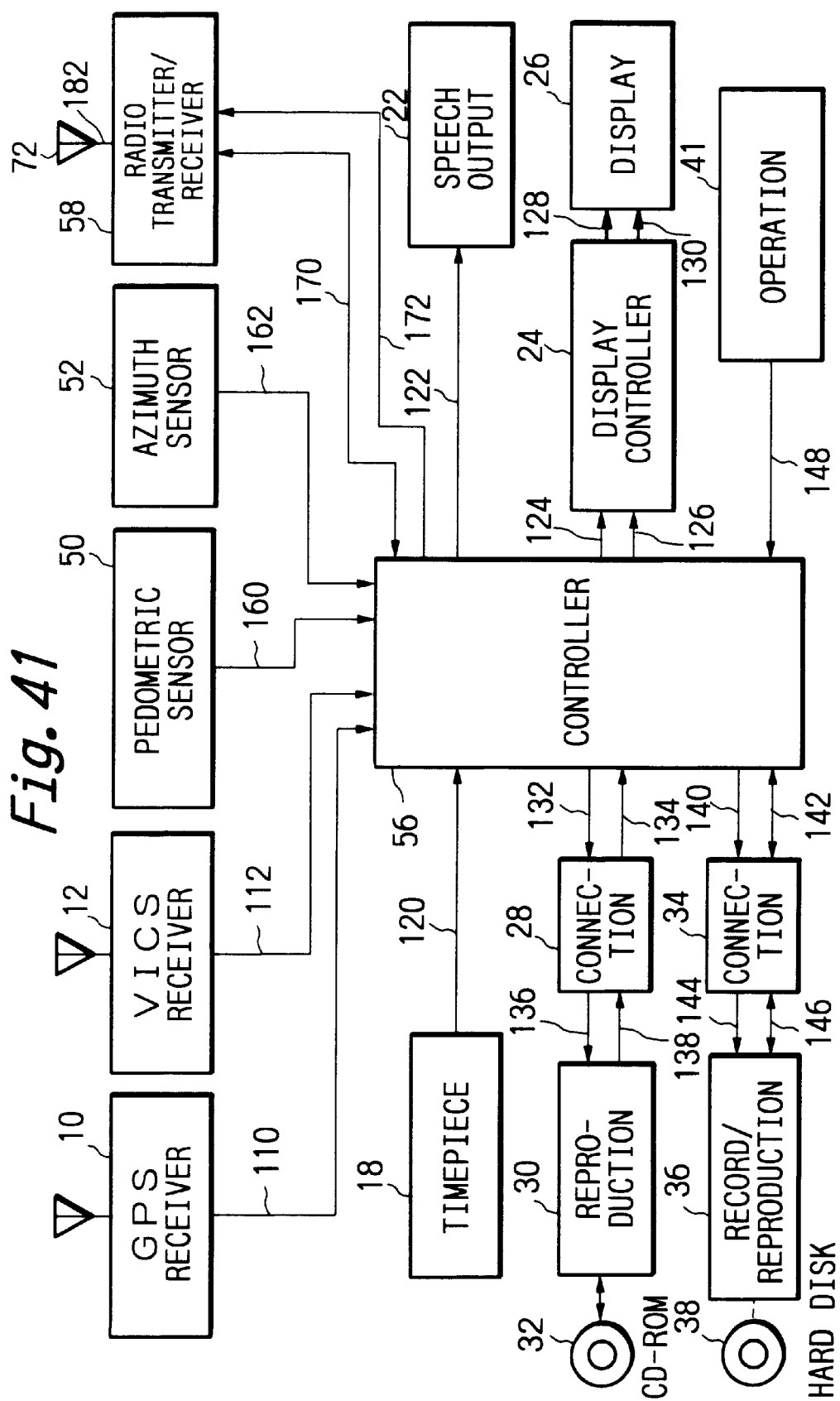

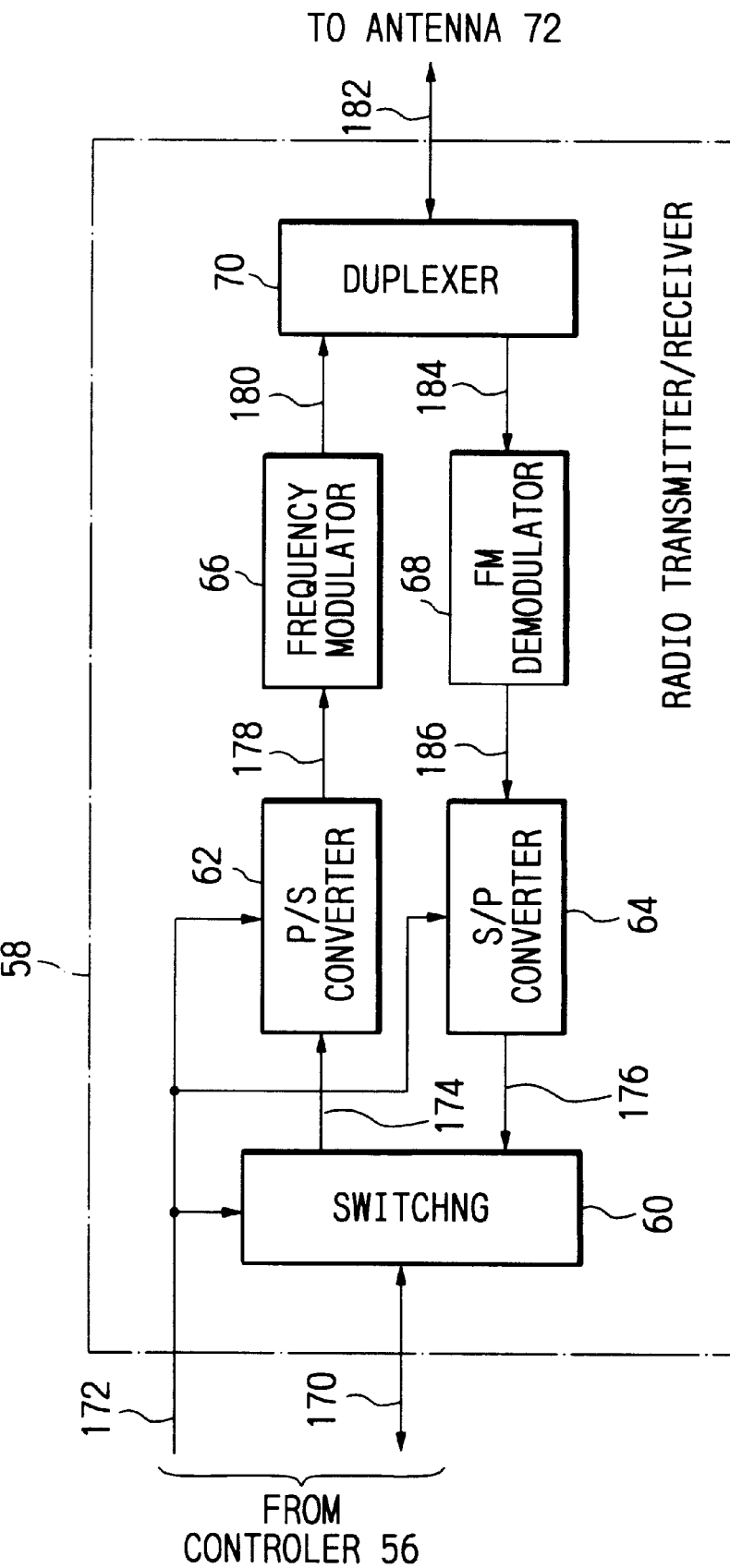

NAVIGATION SYSTEM FOR GUIDING A MOBILE BODY BACK AND FORTH ALONG THE SAME ROUTE BETWEEN TWO POINTS

BACKGROUND OF THE INVENTION

1. Field of the Invention

The present invention relates to a navigation system and, more particularly, to a navigation system capable of guiding a mobile body back and forth along the same route between two remote points.

2. Description of the Background Art

Navigation is a traditional implementation for guiding ships along desired sea routes with accuracy. Today, a navigation system for guiding motor vehicles is attracting increasing attention due to the advances of motorization. The vehicular navigation system detects the current position of a running motor vehicle and displays it on an on-board road map for thereby guiding the operator of the vehicle to a desired destination. When the operator of the vehicle designates a desired destination, the system shows the operator the best route from the current position to the destination.

However, the conventional navigation system has some problems left unsolved, as follows. When the operator of a vehicle desires to repeat the travel to the same destination, the system does not always show the operator the best route to the destination again. Further, the system does not always show the operator the same route when the operator intends to return from the destination to the start point. The system therefore cannot enhance efficient route delivery.

SUMMARY OF THE INVENTION

It is therefore an object of the present invention to provide a navigation system capable of storing data relating to the travel of a mobile body from a start point to a destination, and thereby allowing the operator of the mobile body to drive it back and forth along the same route between such two points, as desired.

A navigation system of the present invention has a storage for storing data based on the movement of a mobile body, and a controller including a data generating circuit for generating the above data. The controller feeds the data generated by the data generating circuit to the storage.

Also, a navigation system of the present invention includes a storage for storing data based on the movement of a mobile body between a start point and a destination. A timepiece generates time data. An operating section includes an interval inputting circuit for allowing the operator of the system to input a desired interval between consecutive times for collecting the data to thereby output a designated interval. A controller controls the storage, timepiece, and operating section. The controller has a time selecting circuit, a satellite navigation position detecting circuit, and an autonomous navigation position detecting circuit. The time selecting circuit selects, in response to the time data and a signal output from the operating section and representative of the designated interval, time data corresponding to the interval out of the time data to thereby output designated time data. The satellite navigation position detecting circuit receives from a satellite a radio stave synchronous to the designated time data, determines a distance between the satellite and the mobile body on the basis of the propagation delay time of the radio wave, and produces first position data representing the position of the mobile body at the start point from the distance. An autonomous navigation position detecting circuit includes a distance sensor and an azimuth sensor. This detecting circuit receives data synchronous to the designated time data from each of the distance sensor and azimuth sensor, produces distance data based on the movement of the mobile body from the data received from the distance sensor, produces azimuth data of the mobile body from the data received from the azimuth sensor, determines a track of movement of the mobile body on the basis of the distance data and azimuth data, and adds the track of movement to the start point to thereby output second position data of the mobile body. The controller feeds the first position data and second position data to the storage together with the designated time data.

BRIEF DESCRIPTION OF THE DRAWINGS

The objects and features of the present invention will become more apparent from the consideration of the following detailed description taken in conjunction with the accompanying drawings in which:

FIG. 40 is a block diagram schematically showing an alternative embodiment of the present invention to which the specific format of FIG. 2 is also applicable;

FIG. 41 is a block diagram schematically showing another alternative embodiment of the present invention; and FIG. 42 is a block diagram schematically showing the other alternative embodiment shown in FIG. 41.

DESCRIPTION OF THE PREFERRED EMBODIMENTS

Figure 1:
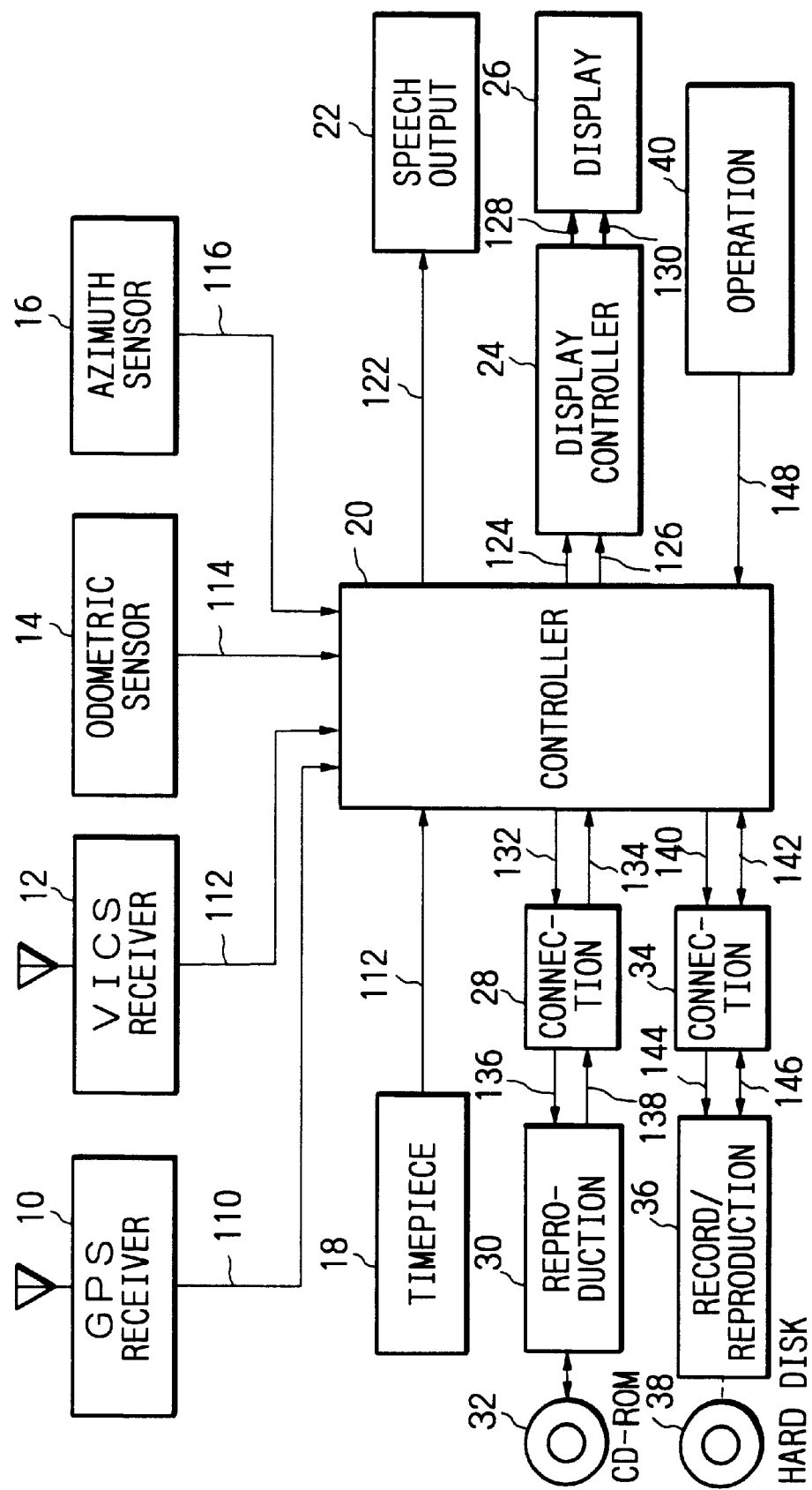
FIG. 1 is a block diagram schematically showing a navigation system embodying the present invention.

Referring to FIG. 1 of the drawings, a navigation system embodying the present invention is shown that is applied to a motor vehicle which is a specific form of a mobile body. Briefly, the system or on-board system is capable of storing various kinds of data necessary for a travel between two remote points in its hard disk, and guiding the operator of the vehicle along the same route back and forth by using such data.

As shown in FIG. 1, the system is made up of a GPS (Global Positioning System) receiver 10, a VICS (Vehicle Information and Communication System) receiver 12, a odometric sensor 14, an azimuth sensor, a timepiece 18, a controller 20, a speech output 22, a display controller 24, a display 26, connections 28 and 34, a reproduction 30, a CD-ROM (Compact Disk Read Only Memory) 32, a record/reproduction 36, a hard disk 38, and an operation 40. The odometric sensor 14 is a specific form of a distance sensor.

The GPS receiver 10 includes a demodulating circuit, a PN (Pseudorandom Noise) code generating circuit, and a PN code correlating circuit, although not shown specifically. A satellite, not shown, modulates a carrier lying in the 1.5 GHz frequency band with a particular PS code assigned to the satellite and navigation message data, thereby producing a spread spectrum or frequency spread signal lying in the 1.5 GHz frequency band. The spread spectrum is sent from the satellite to the demodulating circuit. The demodulating circuit demodulates the spread spectrum and delivers the demodulated PN code and navigation message data to the PN code correlating circuit. The correlating circuit determines a correlation between the demodulated PN code and a PN code input from the PN code generating circuit, and then produces navigation message data designated by the correlated PN code on its output 110. In the illustrative embodiment, navigation message data received from three to four satellites are sequentially produced on the output 110. The output 110 is connected to one input of the controller 20 assigned thereto.

The controller 20 includes a calculating circuit for calculating a distance between the motor vehicle on which the system is mounted and the individual satellite. The calculating circuit determines the position of the motor vehicle on the basis of the calculated distances between the vehicle and the satellites.

The VICS receiver 12 includes a radio beacon receiving circuit, an optical beacon receiving circuit, and an FM (Frequency Modulation) receiving circuit, although not shown specifically. A radio beacon, not shown, modulates a 2.4997 GHz band GMSK (Gaussian Filtered Minimum Shift Keying) signal and an AM (Amplitude Modulation) signal with data and a position signal. The radio beacon receiving circuit receives the modulated GMSK signal and AM signal and demodulates them. The demodulated data and position signal appear on the output 112 of the VICS receiver 12 which is connected to another input of the controller 20 assigned thereto. The controller 20 accurately determined the position of the vehicle on the basis of the demodulated data and position signal input from the radio beacon receiving circuit. At the same time, the controller 20 displays a picture represented by the demodulated data on the display 26 via the display controller 24. That the controller 20 accurately determines the position of the vehicle means that it has a function of correcting the current position of the vehicle in accordance with the position signal received from the radio beacon. The controller 20 additionally has a function of displaying the current position of the vehicle.

The optical beacon receiving circuit of the VICS receiver 12 receives a 1,024 Mbit/sec PAM (Pulse Amplitude Modulation) signal modulated by data and a position signal from an optical beacon, not shown. This receiving circuit demodulates the received PAM signal and produces the resulting demodulated data and position signal on the output 112 of the receiver 12. The controller 20 accurately determines the position of the vehicle on the basis of the data and position signal input from the optical beacon receiving circuit. At the same time, the controller 20 displays a picture represented by the demodulated data on the display 26 via the display controller 24. Again, that the controller 20 accurately determines the position of the vehicle means that is has a function of correcting the current position of the vehicle in accordance with the position signal received from the optical beacon.

The FM receiving circuit of the VICS receiver 12 receives from an FM broadcaster an FM signal modulated by data by use of an L-MSK (Level Controlled Minimum Shift Keying) scheme. The FM receiving circuit demodulates the data and produces the demodulated data on the output 112. The controller 20 displays a picture represented by the data input from the above receiving circuit on the display 26 via the display controller 24.

The odometric sensor or distance sensor 14 generates pulses whose period corresponds to the spinning speed of wheels, i.e., the traveling speed of the vehicle. The pulses output from the odometric sensor 14 are fed to the controller 20 via a signal line 114. The controller 20 includes a calculating circuit for counting the input pulses and determining a drive distance or mileage based on the count of the pulses and the radius of the wheels.

In the illustrative embodiment, the azimuth sensor 16 is implemented by, e.g., an optical fiber gyro capable of sensing a phase difference on the basis of a principle generally referred to as a Sagnac effect. A phase difference signal output from the gyro is applied to the controller 20 via a signal line 116. The controller 20 determines, based on the phase difference signal, a direction in Which the vehicle is running. In addition, the controller 20 has a function of determining the locus of travel of the vehicle by using the phase difference signal and drive distance, i.e., a function of determining it by dead reckoning or autonomous navigation.

The timepiece 18 includes a timepiece circuit for generating time, although not shown in FIG. 1. A time signal output from the timepiece circuit is fed to the controller 20 via a signal line 120. The controller 20 uses, e.g., particular ones of times represented by the time signal as synchronizing signals or trigger signals for collecting various kinds of data of a section of travel. Such particular times, i.e., intervals between the consecutive times of data collection are fed from the operation 40 to the controller 20 via the signal line 148. The various kinds of data including the time data are fed to the record/reproduction 36 via the connection 34 under the control of the controller 20 and written to the hard disk 38.

The speech output 22 is implemented by, e.g., a speaker and driven by a drive signal fed from the controller 20 via a signal line 122. The controller 20 outputs the drive signal when, e.g., a mark representative of the current position of the vehicle (current position mark hereinafter) is deviated from a mark representative of an expected position of the vehicle (guide mark hereinafter) by more than a preselected value. It will therefore be seen that the controller 20 has a function of detecting such a deviation also. The speech output 22 may be replaced with , e.g., a light emitting diode which will glow when the above deviation exceeds the preselected value.

The display controller 24 includes a graphics controller and a graphics VRAM (Video Random Access Memory), although not shown specifically. The graphics controller receives a control signal and picture data from the controller 20 via a control line 126 and a signal line 124, respectively. The graphics controller writes the image data in the graphics VRAM under the control of the control signal. In addition, the graphics controller reads the picture data out of the graphics VRAM and produces them on its output 128 while outputting a control signal necessary for the display 26 on its output 130. The outputs 128 and 130 are connected to the display 26.

The display 26 is a monitor implemented by, e.g., an LCD (Liquid Crystal Display). The display 26 displays a picture represented by the picture data received from the display controller 24 via the signal line 128 in accordance with the control signal also received from the controller 24 via the control line 130.

The connection 28 is an SCSI (Small Computer System Interface) receiving a control signal from the controller 20 via a control line 132 and receiving data having an SCSI format from the reproduction 30 via a signal line 138. The connection 28 transforms the control signal to an SCSI format signal and outputs the SCSI format signal on its output 136. Also, the connection 28 transforms the SCSI format data to data having a format suitable for the controller 20. The input 132 and output 134 of the connection 28 are respectively connected to the preselected output and preselected input of the controller 20. Likewise, the output 136 and input 138 of the connection 28 are respectively connected to the input and output of the reproduction 30.

The reproduction 30 is a CD-ROM drive for reading out of the CD-ROM 32 data designated by the address of the control signal input from the connection 28 via the control line 136. The data read out of the CD-ROM 32 appears on the output 138. Preselected map data are stored in the CD-ROM 32 beforehand. The controller 20 displays a picture represented by the map data on the display 26 via the display controller 24 either on a frame basis or by scrolling it. This is also true with position data stored in the hard disk 38 which will be described later.

The connection 34, which is another SCSI, receives a control signal from the controller 20 via a control line 140 and receives data from the controller 20 via a signal line 142. The connection 34 transforms the control signal to an SCSI format signal and produces the SCSI format signal on its output 144. Also, the connection 34 transforms the data to SCSI format data and produces the SCSI format data on its output 146. Further, the connection 34 transforms SCSI format data received from the record/reproduction 36 via a signal line 146 to data having a format suitable for the controller 20. The input 140 and input/output 142 are respectively connected to the preselected output and preselected input/output of the controller 20. The output 144 and input/output 146 are respectively connected to the input and input/output of the record/reproduction 36.

The record/reproduction 36 is a hard disk drive and receives the control signal from the connection 34 via the control line 144. The record/reproduction 36 selectively reads data designated by the control signal out of the hard disk 38 and produces it on the output 146 or writes the data received from the connection 34 via the signal line 146 in the address of the disk 38 designated by the control signal received from the connection 34 via the signal line 146.

Figure 2:
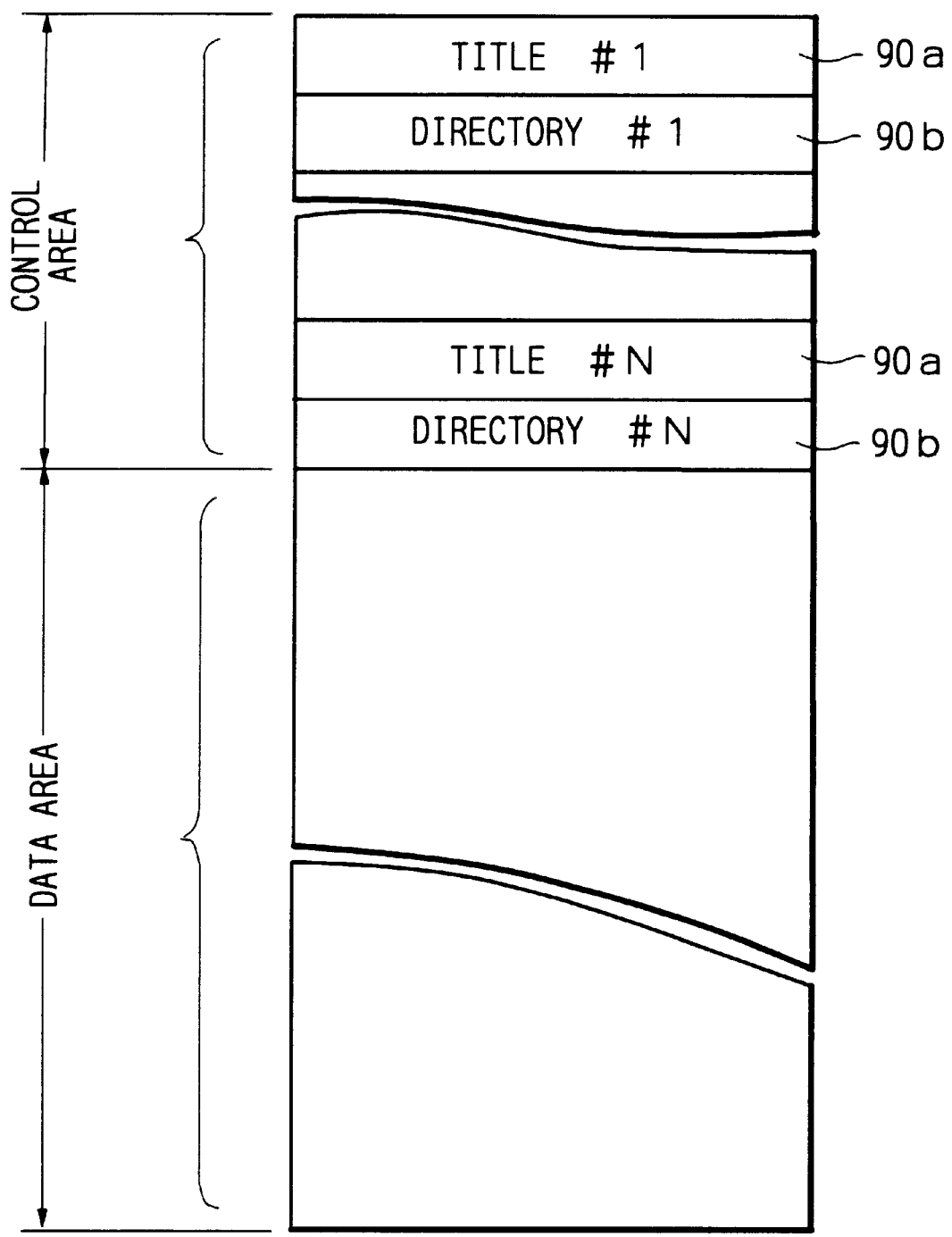
FIG. 2 shows a specific format in which data are written to a hard disk in the embodiment shown in FIG. 1.

FIG. 2 shows a specific format of the hard disk 38. As shown, the hard disk 38 is made up of a control data area 90 for storing information for controlling data, and a data area 92 for storing the data. The control data area 90 is capable of storing n different titles, i.e., titles #1 through #N and n different directories 90b, i.e., directories #1 through # N. In the illustrative embodiment, each title 90a stores data representative of a start point and an end point or destination and entered on the operation 40. Each directory 90b stores the address of the data stored in the associated title 90a. The data area 92 stores various kinds of data including the time data stated earlier. The controller 20 guides the operator of the vehicle by using such data stored in the hard disk 38.

In the illustrative embodiment, the record/reproduction 36 and a recording medium thereof are implemented by a hard disk drive and a hard disk, respectively. Alternatively, the hard disk drive and hard disk may be respectively replaced with a magnetooptical (MO) disk drive and an MO disk or an MD (Mini Disk), if desired. Further, the recording medium may even be implemented by a semiconductor memory.

Referring again to FIG. 1, the operation 40 is a user interface including a circuit having buttons for allowing the operator of the vehicle to input a start point and a destination, a circuit having a button for allowing the operator to input a command for collecting data between the start point and the destination, buttons allowing the operator to select the kinds of data to be collected, a circuit having a button for allowing the operator to specify an interval (seconds) between the consecutive times for data collection, a circuit having buttons for allowing the operator to designate places for obtaining lap times, split times, a total time and other data, a circuit having buttons for allowing the operator to input whether to travel the same routine forward or to travel it backward by using the data stored in the hard disk 38, and a circuit for allowing the operator to input a guide route start command. Data input on the buttons are delivered to the controller 20 via an output 148. While the operation or user interface circuit 40 is implemented by buttons in the illustrative embodiment, use may, of course, be made of a circuit implemented by a mouse or a touch panel.

In the illustrative embodiments, nine different kinds of buttons are available for the operator to designate the kind of data to collect. With a first button, the operator can designate the current position of the vehicle on the map data stored in the CD-ROM 32. The position is represented by bidimensional coordinates (x, y). In this embodiment, the position data of the start point is derived from the position data based on GPS and determined by the controller 20. Specifically, the controller 20 produces the position data of a start point from the position data calculated from the data fed from the GPS receiver 10 at the starting time, i.e., the time fed from the timepiece 18 and the data representative of a position on a map read out of the CD-ROM 32. More specifically, the controller 20 selects a position on a road close to the GPS position data out of the position data on the map data. Alternatively, the operator may input a telephone number particular to the start point on the operation 40, so that the controller 20 can determine the position on the map data of the CD-ROM 32. The telephone number may even be entered via a mouse or a touch panel included in the operation 40.

In the illustrative embodiment, position data on the map data other than the position data at the starting time are produced, as follows. Such position data are determined by the controller 20 at times the intervals of which are designated by the operator on the operation 40. Specifically, the controller 20 determines a track of travel at a time fed from the timepiece 18, i.e., on the elapse of the designated interval, adds the track to position data on the map data and determined at the time one interval before, and then selects a position close to the resulting position data out of the map data.

A second button basically allows the operator to select the current position of the vehicle on the basis of both of GPS and autonomous navigation. The current position is also represented by bidimensional coordinates (x, y). In this case, in the illustrative embodiment, position data representative of the start point is GPS data. Specifically, the controller 20 produces this position data from data fed from the GPS receiver 10 at the time fed from the timepiece 18, i.e., at the starting time.

In the illustrative embodiment, position data at times other than the starting time are produced by the controller 20, as follows. The controller 20 generates position data adjusted by position data determined by GPS at the time fed from the timepiece 18, i.e., on the elapse of the designated interval and the track of travel determined by autonomous navigation, and adds the generated position data to position data produced one interval before.

When the vehicle is located at a place where the GPS radio wave is not available, the controller 20 may use only the position data produced from the track of travel available with the autonomous navigation. That is, the position data derived from autonomous navigation may be used as a supplement to the GPS position data. Errors in autonomous navigation and ascribable to, e.g., the wear of the wheels may be corrected by the GPS position data. Further, the controller 20 may determine whether or not the GPS position data and autonomous navigation position data are moving parallel to each other, and correct a change, if any, by reckoning based on the past data.

A third button allows the operator to select a relation between the drive distance or mileage and the elapsed time or required time. For example, the time and distance are respectively indicated by the abscissa (x axis) and ordinate (y axis). As for the start point, both the distance and time are zero. In this embodiment, the time data and distance data are output by the controller 20 in synchronism with the times of the designated time intervals. Specifically, the controller 20 sees a time fed from the timepiece 18 at the designated interval and subtracts the time at the start point from the above time, thereby producing an elapsed time. In addition, the controller 20 determines a drive distance on the basis of data fed from the odometric sensor 14.

A fourth button allows the operator to select a vehicle speed. In this embodiment, a vehicle speed is represented by time and distance respectively indicated by the abscissa (x axis) and ordinate (y axis). As for the start point, both the distance and time are zero, and therefore the vehicle speed is also zero. Basically, the controller 20 produces time data and distance data in synchronism with the times of the designated intervals. Specifically, the controller 20 subtracts from distance data of the time fed from the timepiece 18, i.e., the time of the designated interval the distance data produced at the time one interval before. The resulting difference is representative of the distance which the vehicle has run over the designated interval. While the system may not collect data at the designated intervals, during, e.g., travel on a straight road, it suffices to determine an approximate distance which the vehicle has moved between the consecutive times for data collection.

Figure 39:
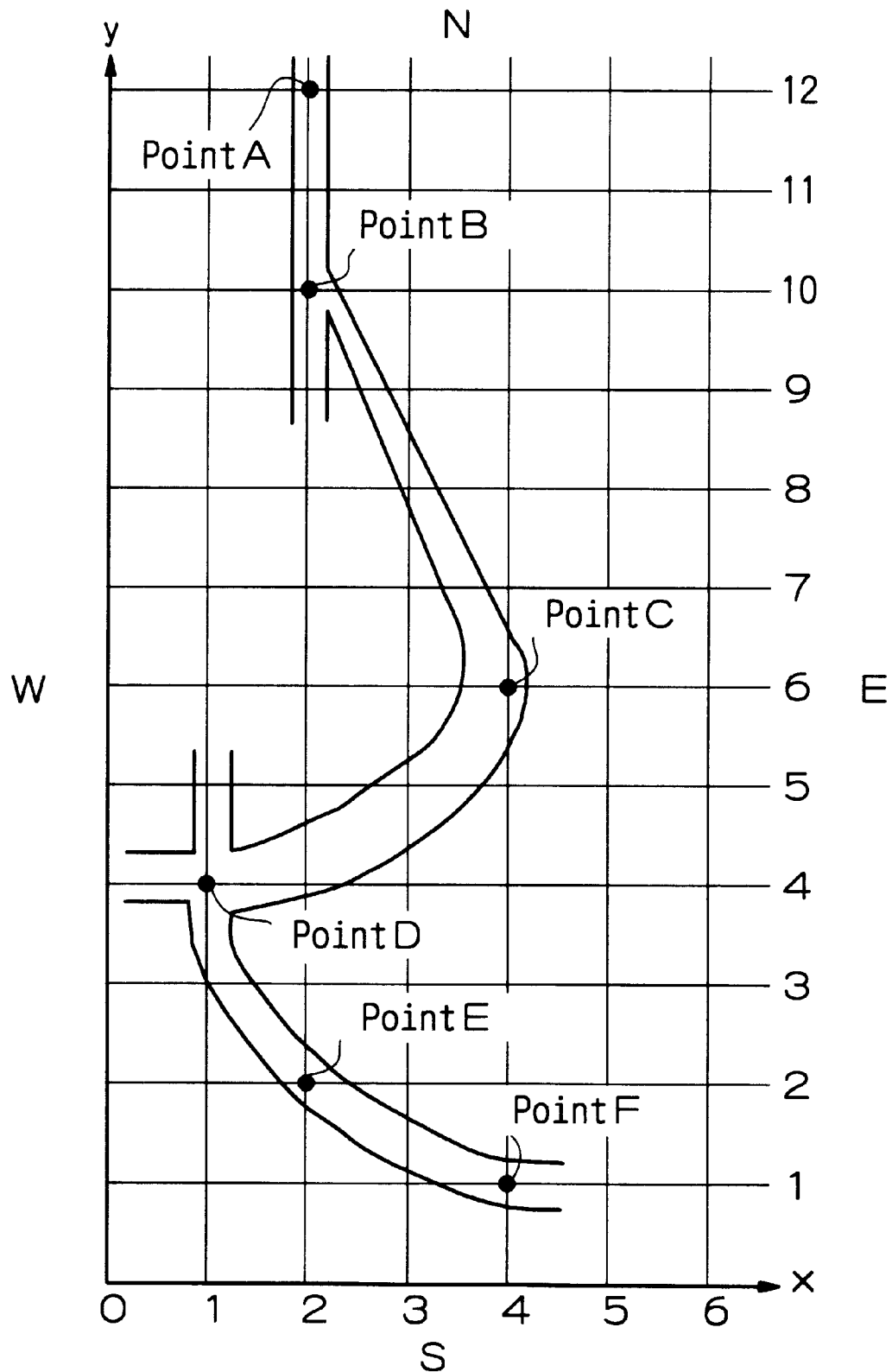

A fifth button allows the operator to select a lap time. As shown in FIG. 39, assume that the vehicle with the on-board system runs from a start point A to an end point or destination F by way of points B, C, D and E. Then, in this embodiment, the lap time mentioned above refers to an elapsed time and a travelled distance between the points A and C, between the points A and D or between the points A and E. In this case, a lap time and a distance are respectively indicated by the abscissa (x axis) and ordinate (y axis). Basically, the controller 20 produces these data in synchronism with the times of the designated intervals. Specifically, the controller 20 sees, e.g., the point A on the basis of the time fed from the timepiece 18, sees a place designated beforehand, e.g., the point C on the basis of the next time fed from the timepiece 18, and subtracts the time at the point C from the time at the point A to thereby determine an elapsed time. In addition, the controller 20 determines a travelled distance between the points A and C on the basis of data output from the odometric sensor 14.

A sixth button allows the operator to select a split time. In this embodiment, the split time refers to an elapsed time and a travelled distance between the points A and B, between the points B and C, between the points C and D, between the points D and E or between the points E and F. In this case, a split time and a distance are respectively indicated by the abscissa (x axis) and ordinate (y axis). Basically, these data are produced by the controller 20 in synchronism with the times of the designated intervals. Specifically, the controller 20 sees, e.g., the point A on the basis of the time of the designated interval fed from the timepiece 18, sees a place designated beforehand, e.g., the point B from the next time led from the timepiece 18, and subtracts the time at the point B from the time at the point A to thereby determine an elapsed time between the points A and B. In addition, the controller 20 determines a travelled distance between the points A and B on the basis of data fed from the odometric sensor 14.

A seventh button allows the operator to select a total time. In the illustrative embodiment, the total time refers to an elapsed time and a distance between the two points A and F shown in FIG. 39. The total time (period of time) and distance are indicated by the abscissa (x axis) and ordinate by axis), respectively. Basically, these data are produced by the controller 20 in synchronism with the times of the designated intervals. Specifically, the controller 20 sees the start point A on the basis of the time of the designated interval fed from the timepiece 18, sees the point or destination F selected beforehand on the basis of the time of the next time fed from the timepiece 18, and subtracts the time at the point F from the time at the point A to thereby determine a total time. In addition, the controller 20 determines a travelled distance between the points A and F on the basis of data fed from the odometric sensor 14.

An eighth button allows the operator to select an azimuth or direction. In the illustrative embodiment, an azimuth is represented by coordinate data shown in FIG. 9. As shown, the coordinate data is, e.g., (0x, 4y) when the vehicle is travelling north, or (4x, 0y) when it is travelling east, or (0x,−4y) when it is travelling south, or (−4x, 0y) when it is travelling west. This data is produced by the controller 20 in synchronism with the times of the designated intervals. Specifically, the controller 20 determines an azimuth in synchronism with the above times from data fed from the azimuth sensor 16.

A ninth button allows the operator to select a time. Basically, the time is determined by the controller 20 in synchronism with the time of the designated interval. Specifically, the controller 20 determines a time of the designated interval fed from the timepiece 18, and delivers data of this time to the record/reproduction 36.

The controller 20 includes a CPU (Central Processing Unit), a ROM (Read Only Memory), and a RAM (Random Access Memory serving as a work area.

The controller 20 controls the various functions of the system on the basis of data fed from the buttons of the operation 40 via the control line 148, GPS data fed from the GPS receiver 10 via the signal line 110, VICS data fed from the VICS receiver 12 via the signal line 112, data fed from the odometric sensor 14 via the signal line 114, data fed from the azimuth sensor 16 via the signal line 116, data fed from the timepiece 18 via the signal line 120, data fed from the reproduction 30 via the connection 28, and data fed from the record/reproduction 36 via the connection 34. The controller 20 delivers, based on such data, control data and signal data to the speech output 22 via the signal line 122, to the display controller 24 via the signal line 124 and control line 126, to the connection 28 via the control line 132, and to the connection 34 via the control line 140.

How the controller 20 writes the data necessary for a travel and output from the various sections of the on-board system in the hard disk or storage 38 will be described hereinafter. Again, assume the vehicle runs from the start point A to the destination F by way of the points B, C, D and E, as shown in FIG. 39.

Assume that the vehicle is held in a halt at the start point A. First, the operator presses the buttons of the operation 40 in order to input data indicative of the start point A and data indicative of the destination F. These data are fed to the controller 20 via the control line 148. The controller 20 transfers the above data to the hard disk 38 via the connection 34 and record/reproduction 36. As a result, the data are written to, e.g., the first title 90*a* (TITLE #1) of the hard disk 38. If desired, the operator may input the data indicative of the destination F when the vehicle has arrived at the destination F or during the travel from the point A to the point F.

The operator entered the above data commands the system to collect, in the illustrative embodiment, nine different kinds of data via the buttons of the operation 40. The nine different kinds of data are position data on the map data, position data based on GPS and autonomous navigation, data representative of the elapsed times and distances of travel covered, speed data, lap time data, split time data, total time data, azimuth data, and time data, as stated earlier. Subsequently, the operator manipulates the buttons of the operation 40 for commanding the system to count lap times between the points A and C, between the points A and D, and between the points A and E, split times between the points A and B, between the points B and C, between the points C and D, between the points D and E, and between the points E and F, and a total time between the points A and F. Then, the operator commands the system to collect data, in the embodiment, every second on the button of the operation 40. It is to be noted that such a sequence of manipulation is only illustrative. Thereafter, the operator inputs a data collection start command on the operation 40. These data are delivered to the controller 20 via the control line 148.

The controller 20 regards time data fed from the timepiece 18 just after the entry of the data collection start command as time data representative of the starting time. The controller 20 generates nine different kinds of data at the starting time and sends them to the hard disk 38 via the connection 34 and record/reproduction 36. The data are written to the data area 92 of tie hard disk 38. In the illustrative embodiment, the data are sequentially written to the data area 92 in the incrementing order of addresses. The controller 20 delivers the leading one of the addresses for storing the above data to the first directory 90*b* (DIRECTORY #1).

Figure 3:
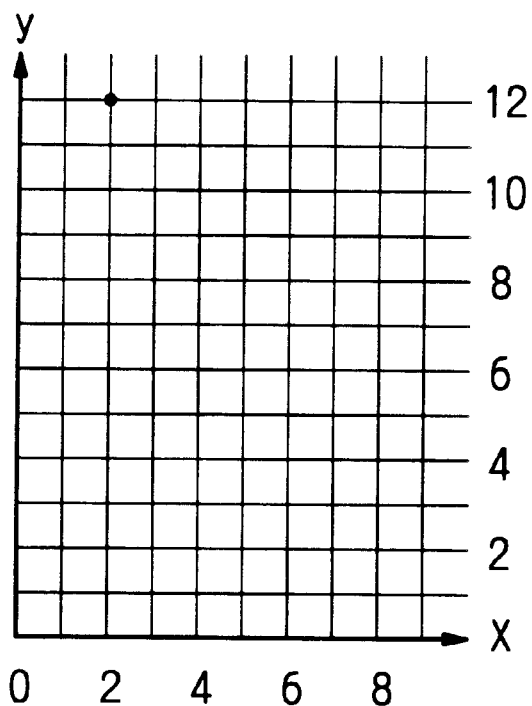
FIGS. 3 through 39 demonstrate a specific operation of the embodiment shown in FIG. 1.
Figure 4:
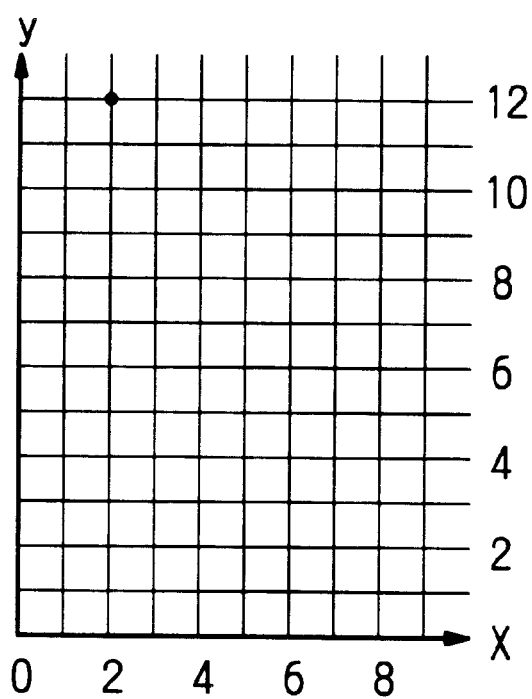
Figure 5:
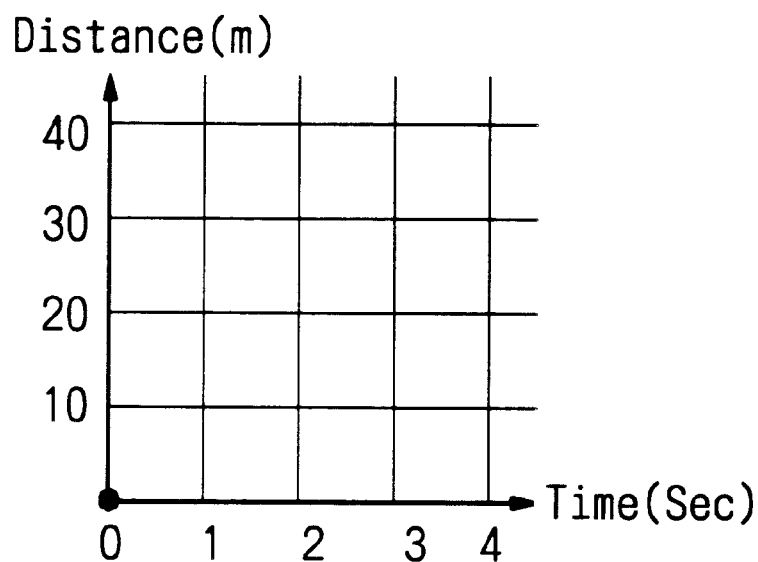
Figure 6:
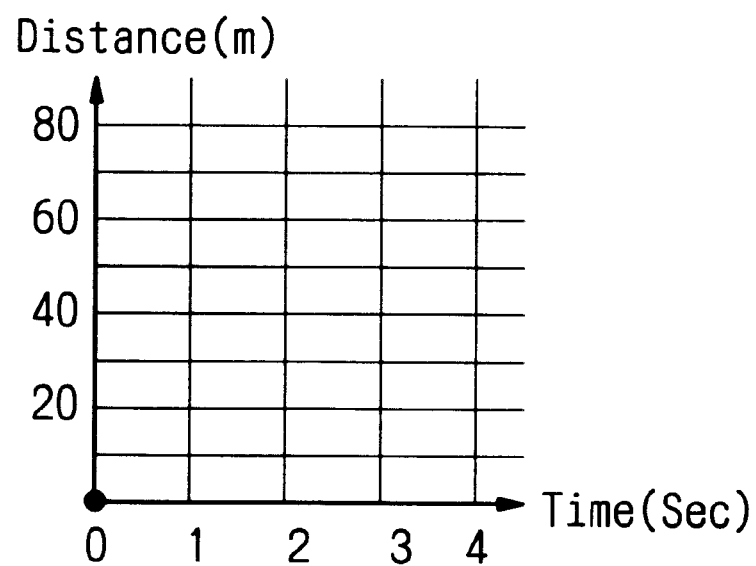
Figure 7:
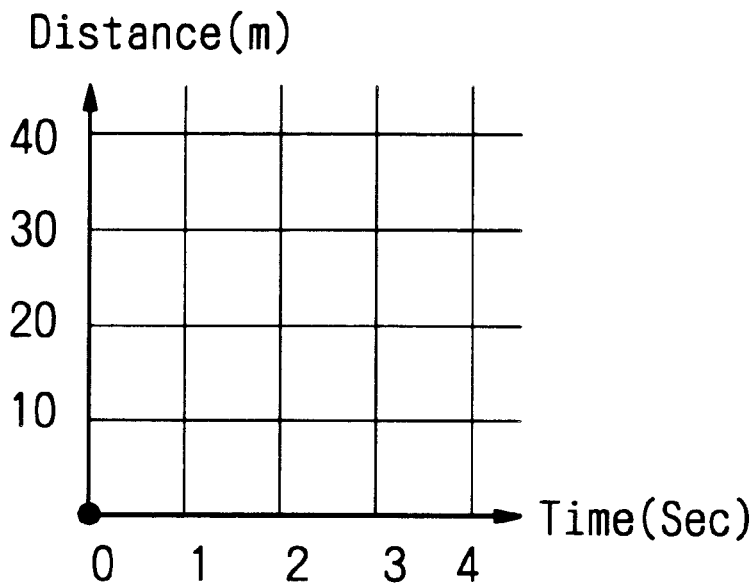
Figure 8:
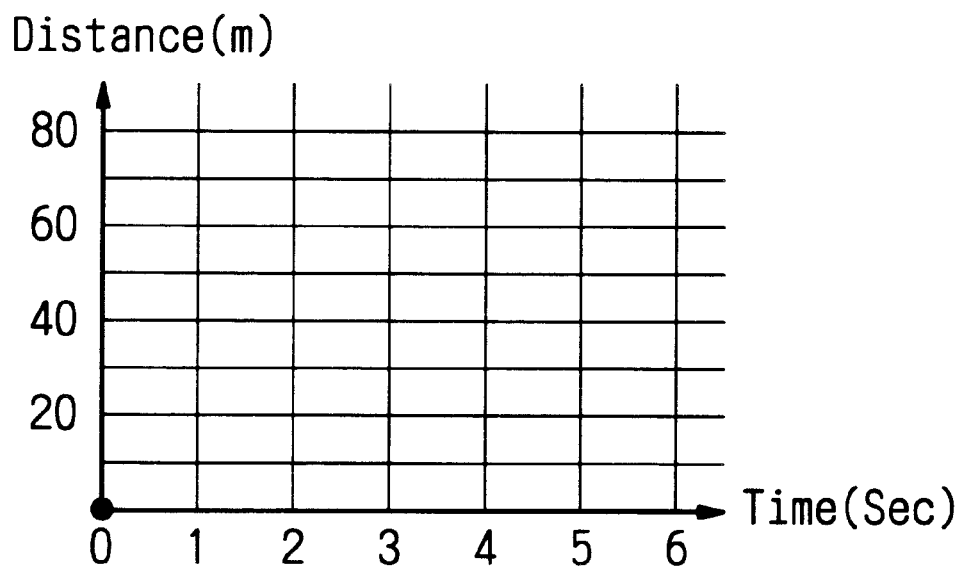

Data relating to the start point A are as follows. The start point A is indicated by a dot in FIG. 3 and represented by coordinates (x2, y12) in terms of position data on the map data. As for position data based on GPS and autonomous navigation, the start point A is also indicated by a dot in FIG. 4 and represented by coordinates (x2, y12). While the two kinds of data are shown as being coincident, they are sometimes different from each other.

Figure 9:
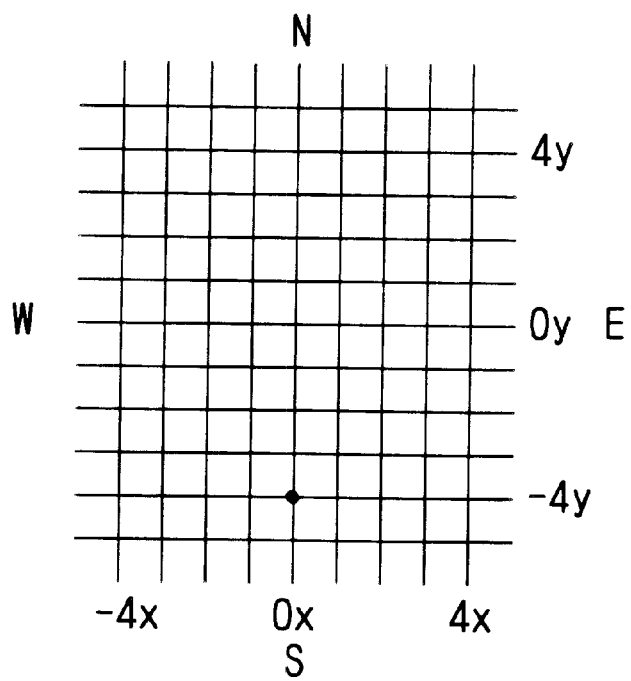

FIGS. 5, 6, 7 and 8 show dots representative of the coordinate values of speed data at the start point A, i.e., the coordinates of a lap time, the coordinates of a split time, and the coordinates of a total time, respectively. As shown, both the time and distance are zero because the vehicle is in a halt. As shown in FIG. 9, direction data is represented by a dot having coordinates (0x, −4y) because the wheels of the vehicle are directed south. Assume that the vehicle starts running at 1 o'clock, 0 minute and 0 second. Then, time data indicative of 1 o'clock, 0 minute and 0 second is generated and written to the data area 92 of the hard disk 38.

Assume that the vehicle started at the point A arrives at the point B in 1 second, running 10 meters. Then, in parallel with this travel, the timepiece 18 sends time data indicative of 1 o'clock, 0 minute and 1 second to the controller 20. In response, the controller 20 generates seven different kinds of data other than those relating to a lap time and a total time.

The seven kinds of data are delivered to the hard disk 38 via the connection 34 and record/reproduction 36 and written to the unoccupied addresses of the data area 92 in the incrementing order of addresses.

Figure 10:
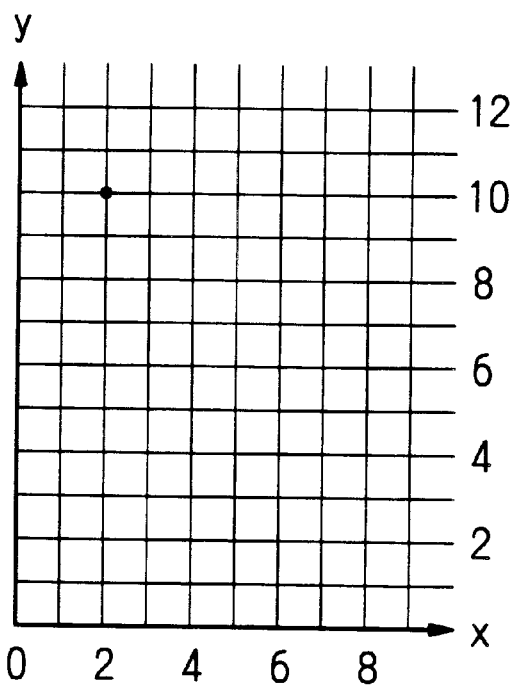
Figure 11:
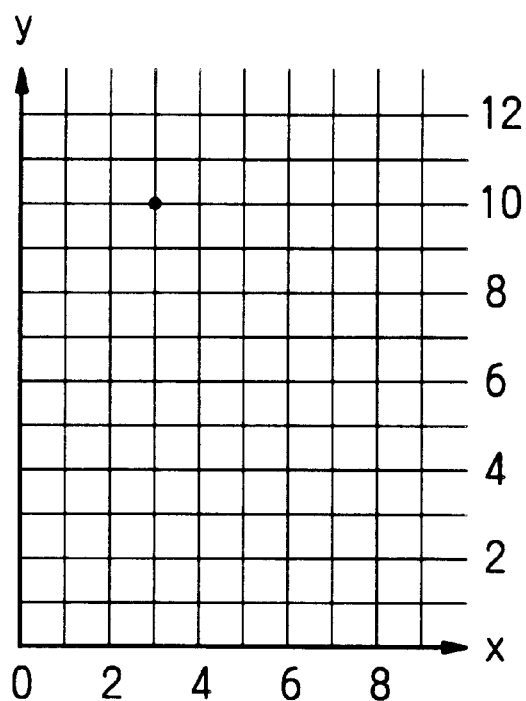
Figure 12:
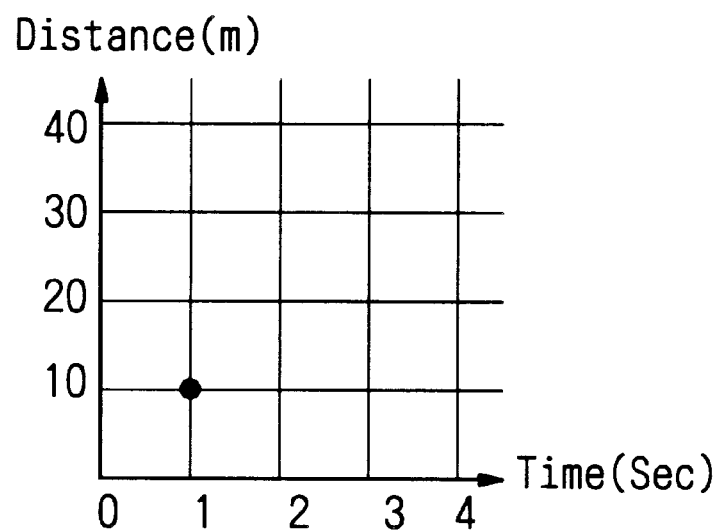
Figure 13:
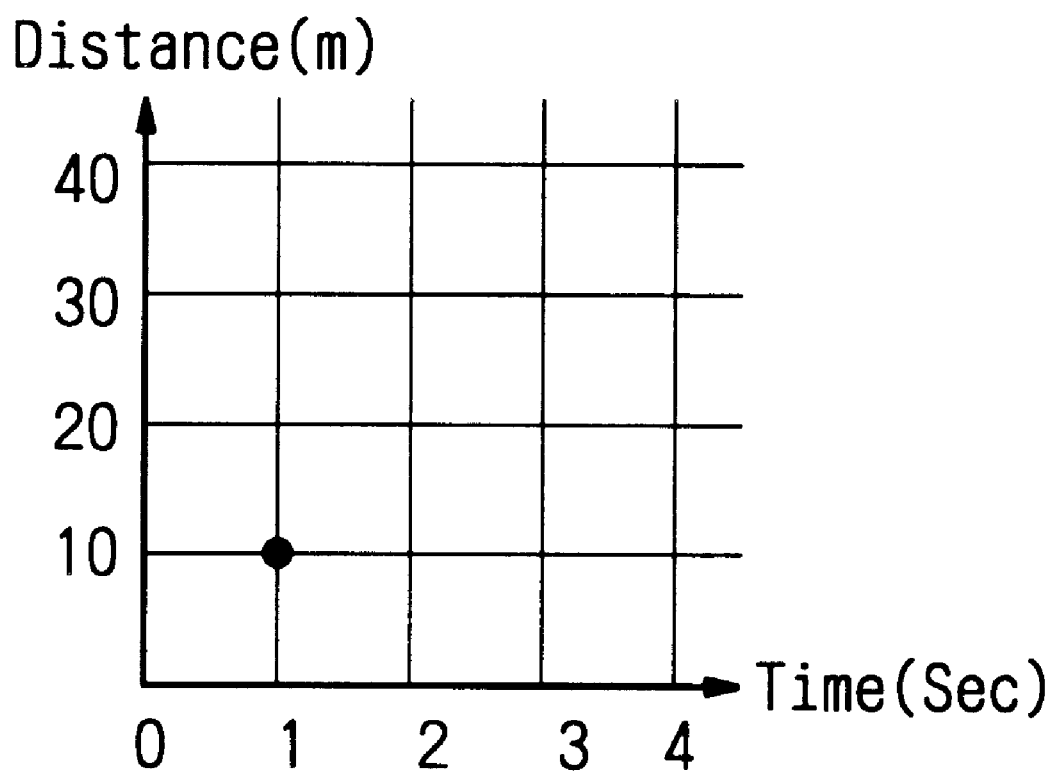
Figure 14:
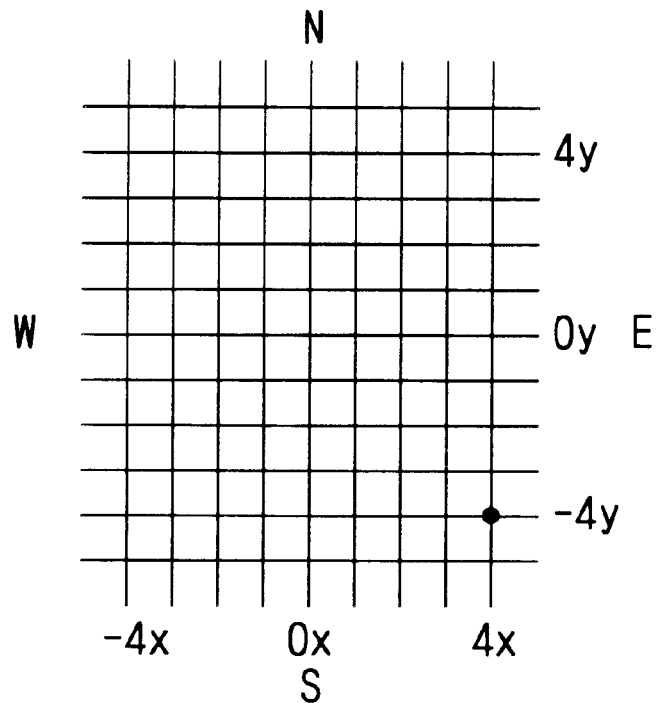

The point B is indicated by a dot in FIG. 10 and represented by coordinates (x2, y10) in terms of position data on the map data. As for position data based on GPS and autonomous navigation, the point B is indicated by a dot in FIG. 11 and represented by coordinates (x3, y10). FIG. 12 shows a dot representative of speed data in terms of coordinates. As shown, the dot indicates that x is 1 second and y is 10 meters, i.e., the vehicle speed is 10 meters per second. A dot shown in FIG. 13 shows that a split time between the two points A and B is 1 second, i.e., x is 1 second and y is 10 meters. A dot shown in FIG. 14 shows that direction data is (4x, −4y) in terms of coordinates because the wheels are now directed east-southeast. At the point B, time data indicative of 1 o'clock, 0 minute and 1 second is generated and written to the data area 92 of the hard disk 38.

Assume that the vehicle moves from the point B to the point C in 1 second, running 30 meters. Then, in parallel with this travel, the timepiece 18 sends time data indicative of 1 o'clock, 0 minute and 2 seconds to the controller 20. In response, the controller 20 generates eight different kinds of data other than data relating to a total time and sends them to the hard disk 38 via the connection 34 and record/ reproduction 36. These data are also written to the unoccupied addresses of the data area 92 in the incrementing order of addresses.

Figure 15:
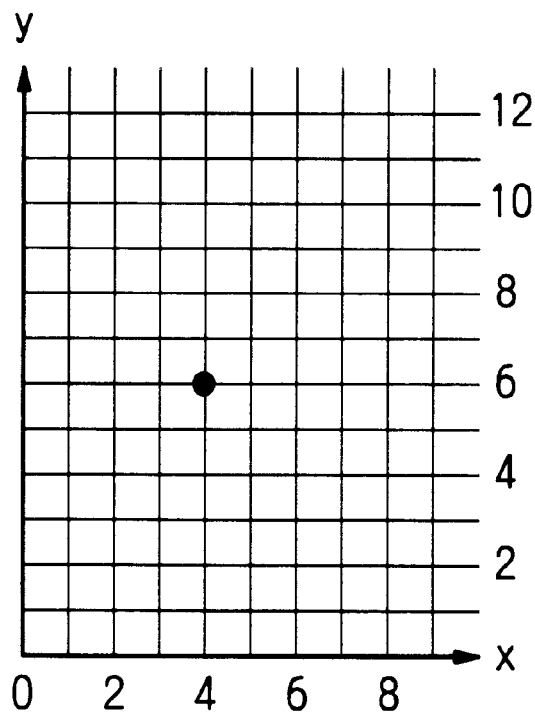
Figure 16:
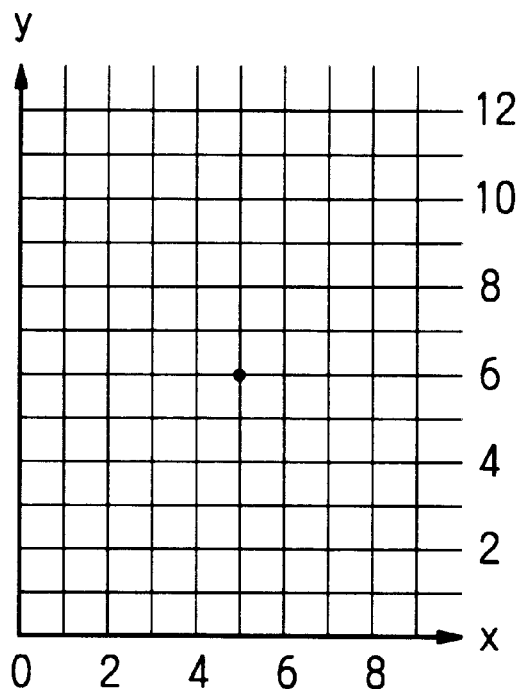
Figure 17:
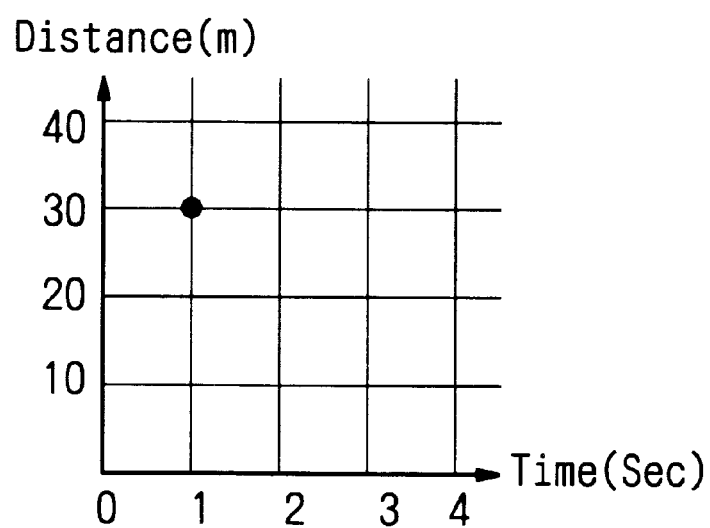
Figure 18:
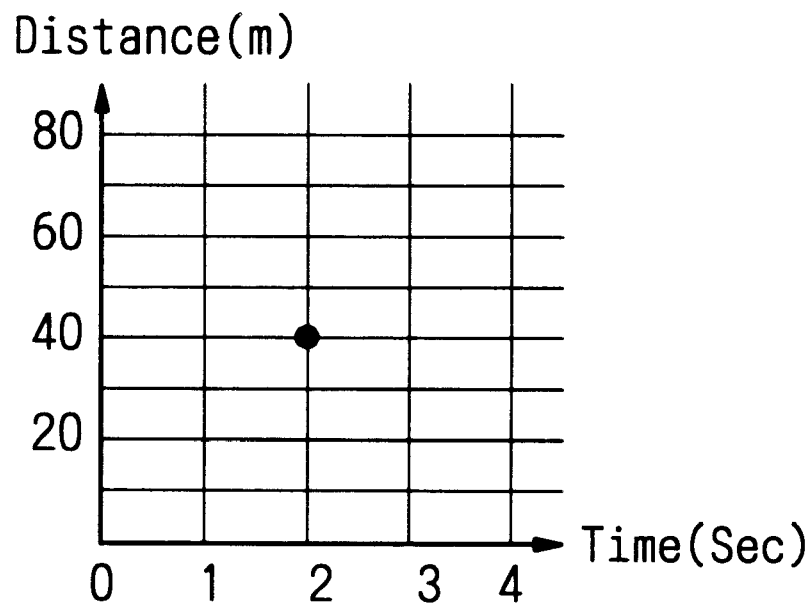
Figure 19:
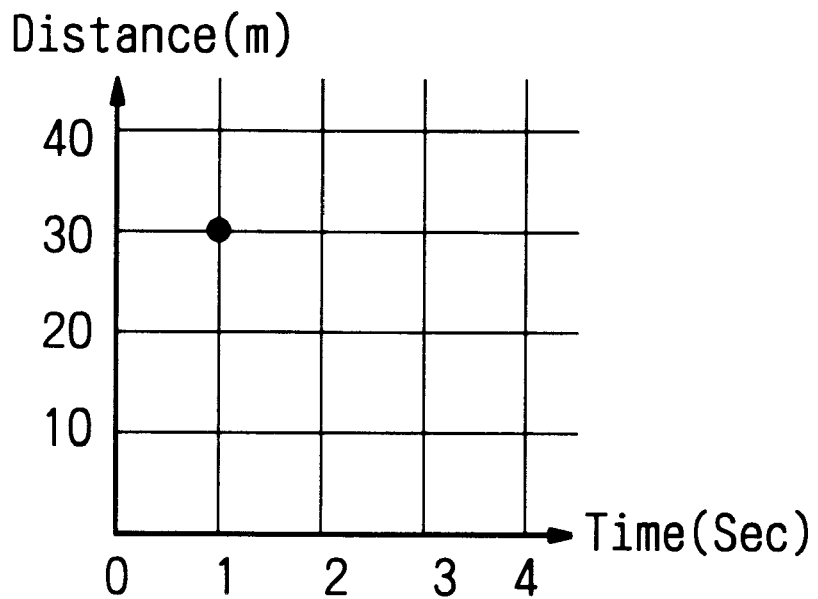
Figure 20:
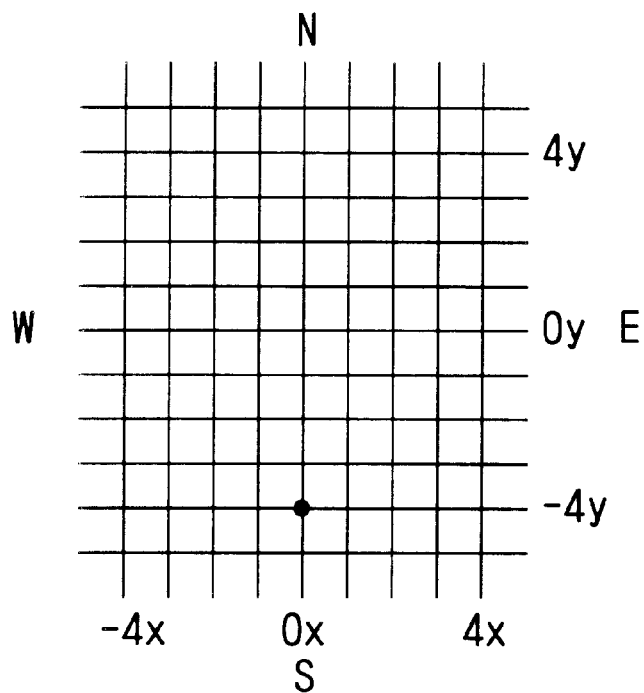
Figure 21:
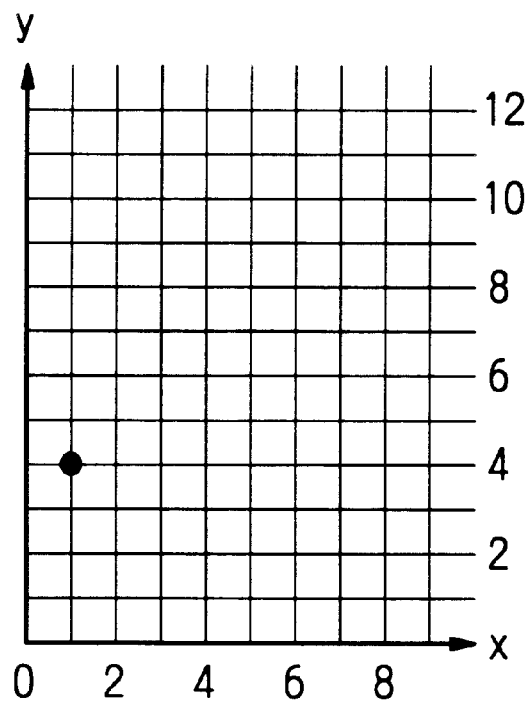

The point C is indicated by a dot in FIG. 15 and represented by coordinates (x4, y6) in terms of position data on the map data. As for position data based on GPS and autonomous navigation, the point C is indicated by a dot in FIG. 16 and represented by coordinates (x5, y6). FIG. 17 shows a dot representative of speed data in terms of coordinates. As shown, the dot indicates that x is 1 second and y is 30 meters, i.e., the vehicle speed is 30 meters per second. A dot shown in FIG. 18 shows that a lap time between the points A and C is 2 seconds because x is 2 seconds and y is 40 meters. Also, a dot shown in FIG. 19 shows that a split time between the two points B and C is 1 second, i.e., x is 1 second and y is 30 meters. Further, a dot shown in FIG. 20 shows that direction data is (0x, −4y) in terms of coordinates because the wheels are again directed south. At the point C, time data indicative of 1 o'clock, 0 minute and 2 seconds is generated and written to the data area 92 of the hard disk 38.

Assume that the vehicle moves from the point C to the point D in 1 second, running another 20 meters. Then, in parallel with this travel, the timepiece 18 sends time data indicative of 1 o'clock, 0 minute and 3 seconds to the controller 20. In response, the controller 20 generates eight different kinds of data other than data relating to a total time and sends them to the hard disk 38 via the connection 34 and record/reproduction 36. These data are also written to the unoccupied addresses of the data area 92 in the incrementing order of addresses.

Figure 22:
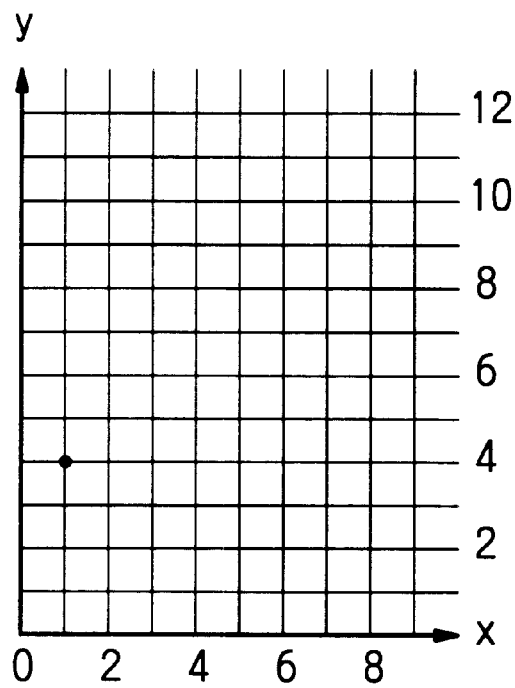
Figure 23:
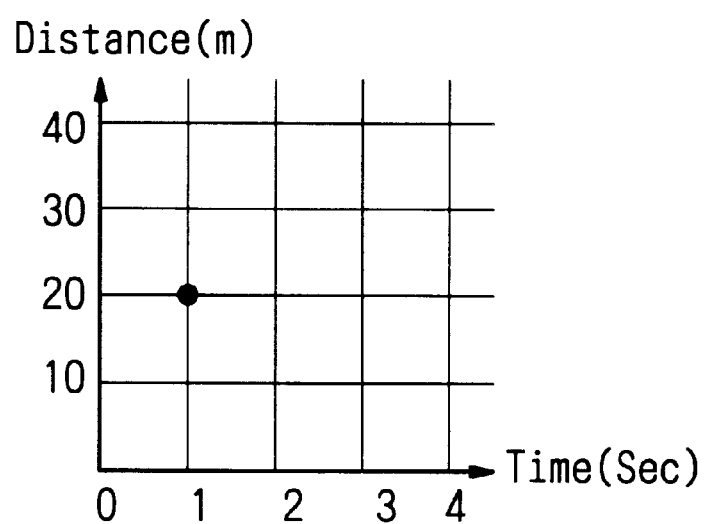
Figure 24:
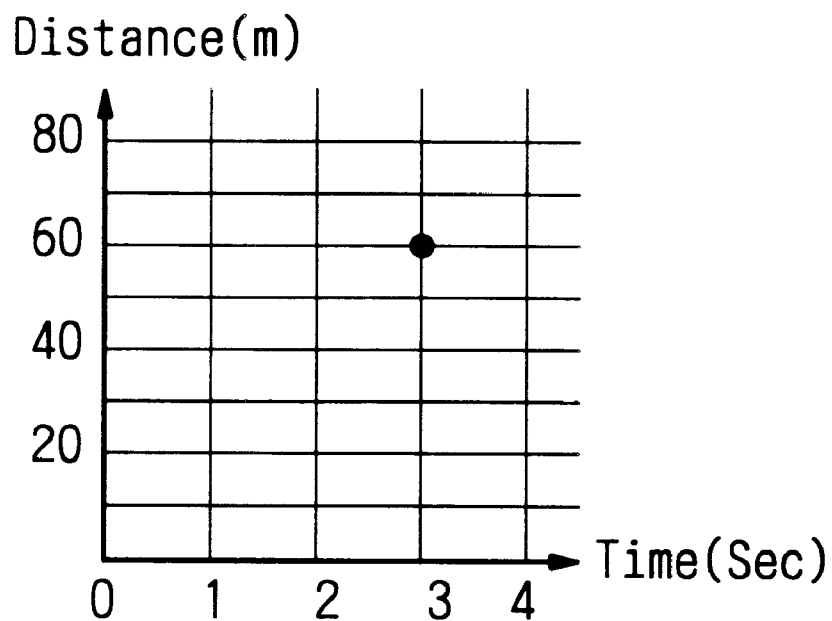
Figure 25:
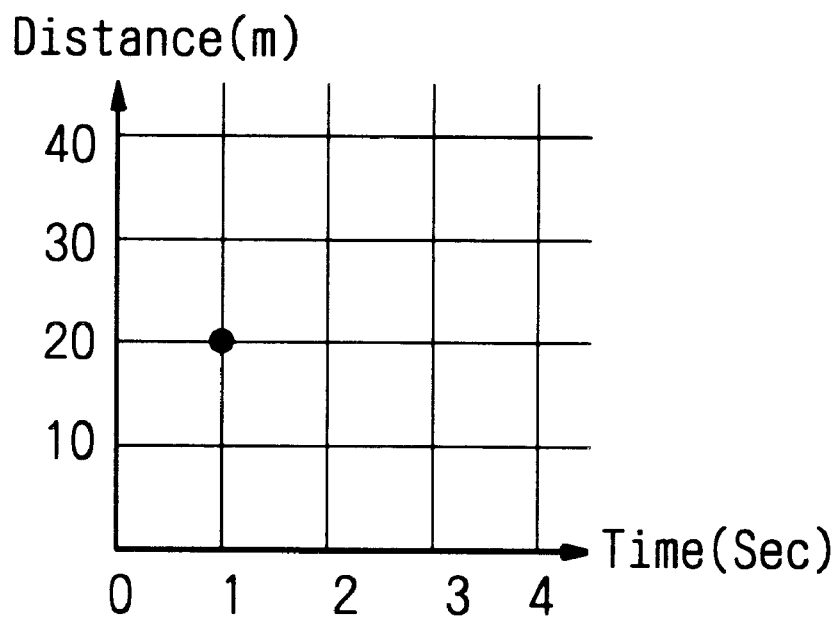
Figure 26:
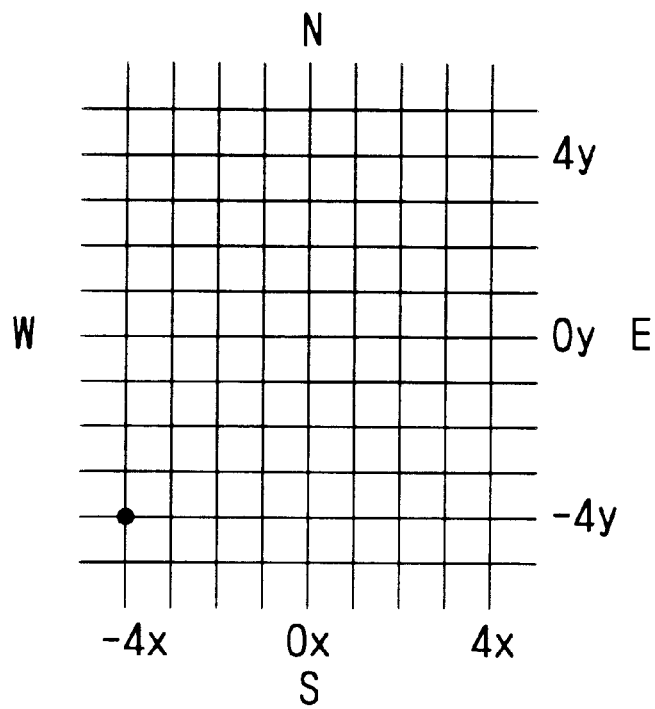

The point D is indicated by a dot in FIG. 23 and represented by coordinates (x1, y4) in terms of position data on the map data. As for position data based on GPS and autonomous navigation, the point D is indicated by a dot in FIG. 22 and represented by coordinates (x1, y4). FIG. 23 shows a dot representative of speed data in terms of coordinates. As shown, the dot indicates that x is 1 second and y is 20 meters, i.e., the vehicle speed is 20 meters per second. A dot shown in FIG. 24 shows that a lap time between the points A and D is 3 seconds because x is 3 seconds and y is 60 meters. Also, a dot shown in FIG. 25 shows that a split time between the two points C and D is 1 second, i.e., x is 1 second and y is 20 meters. Further, a dot shown in FIG. 26 shows that direction data is (−4x, −4y) in terms of coordinates because the wheels are now directed west-southwest. At the point D, time data indicative of 1 o'clock, 0 minute and 3 seconds are generated and written to the data area 92 of the hard disk 38.

Assume that the vehicle moves from the point D to the point E in 1 second, running 10 meters. Then, in parallel with this travel, the timepiece 18 sends time data indicative of 1 o'clock, 0 minute and 4 seconds to the controller 20. In response, the controller 20 generates eight different kinds of data other than data relating to a total time and sends them to the hard disk 38 via the connector 34 and record/reproduction 36. These data are also written to the unoccupied addresses of the data area 92 in the incrementing order of addresses.

Figure 27:
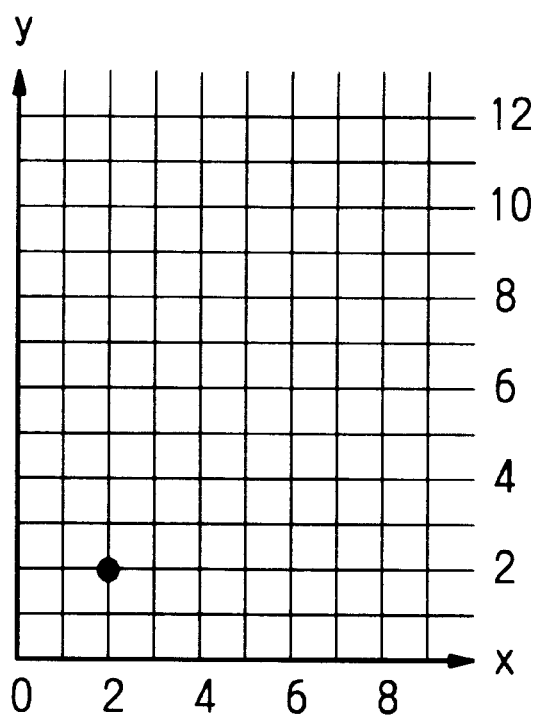
Figure 28:
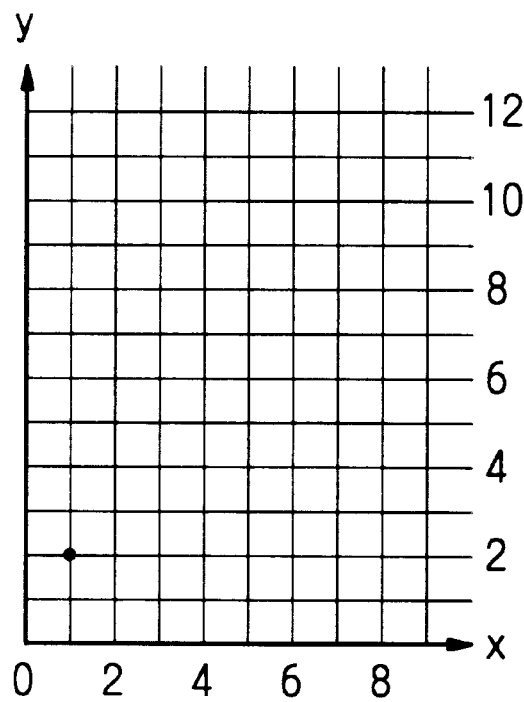
Figure 29:
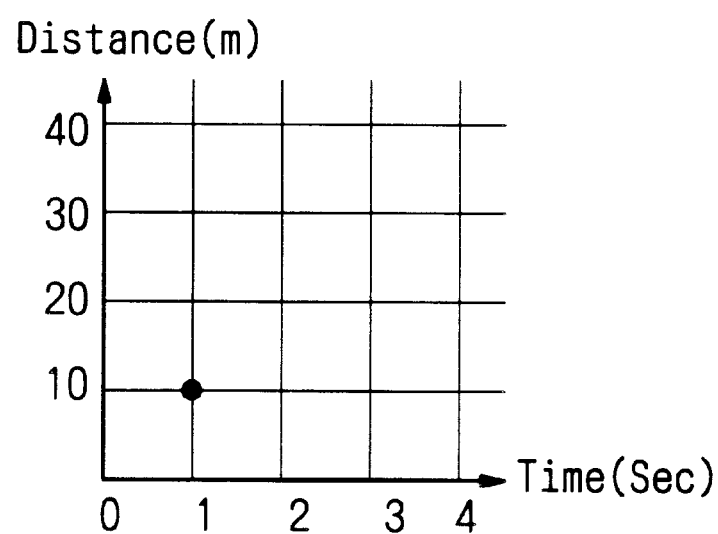
Figure 30:
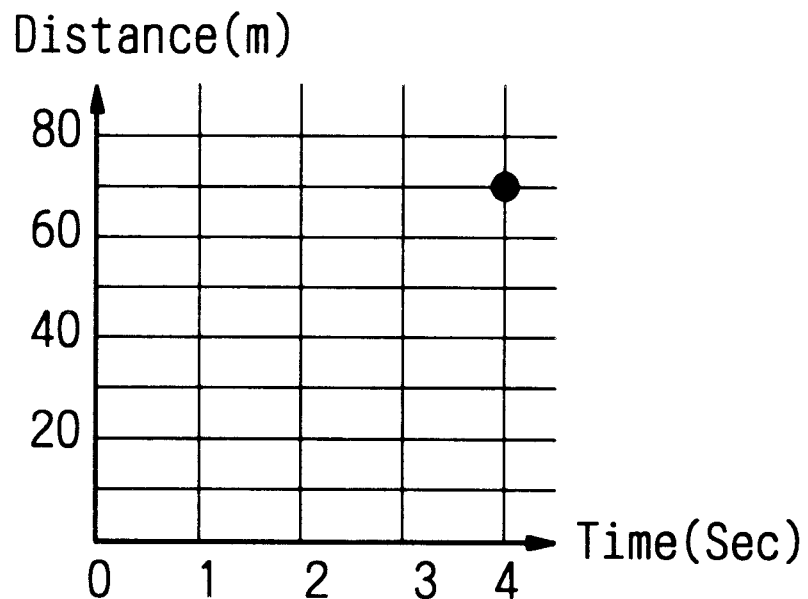
Figure 31:
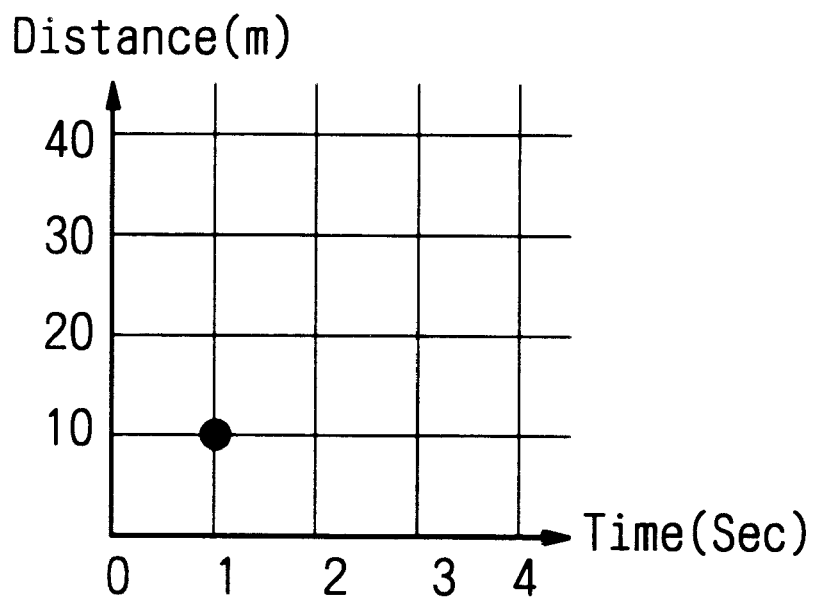
Figure 32:
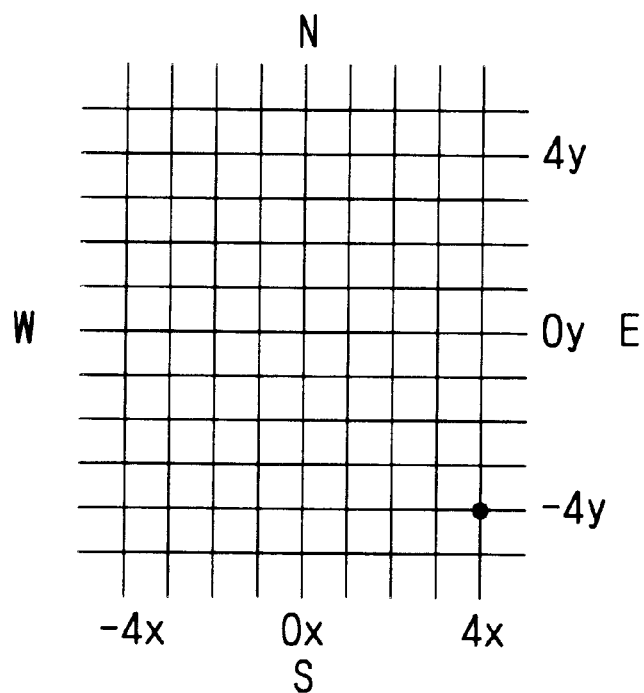

The point E is indicated by a dot in FIG. 27 and represented by coordinates (x2, y2) in terms of position data on the map data. As for position data based on GPS and autonomous navigation, the point E is indicated by a dot in FIG. 28 and represented by coordinates (x1, y2). FIG. 29 shows a dot representative of speed data in terms of coordinates. As shown, the dot indicates that x is 1 second and y is 10 meters, i.e., the vehicle speed is 10 meters per second. A dot shown in FIG. 30 shows that a lap time between the points A and E is 4 seconds because x is 4 seconds and y is 70 meters. Also, a dot shown in FIG. 31 shows that a split time between the two points D and E is 1 second, i.e., x is 1 second and y is 10 meters. Further, a dot shown in FIG. 32 shows that direction data is (4x, −4y) in terms of coordinates because the wheels are again directed east-southeast. At the point E, time data indicative of 1 o'clock, 0 minute and 4 seconds is generated and written to the data area 92 of the hard disk 38.

Assume that the vehicle moves from the point E to the point F or destination in 1 second, running another 10 meters. Then, in parallel with this travel, the timepiece 18 sends time data indicative of 1 o'clock, 0 minute and 5 seconds to the controller 20. In response, the controller 20 generates eight different kinds of data other than data relating to a lap time and sends them to the hard disk 38 via the connection 34 and record/reproduction 36. These data are also written to the unoccupied addresses of the data area 92 in the incrementing order of addresses. In this case, the controller 20 delivers the last address having stored the above data to the first directory 90b of the hard disk 38. As a result, the start address and end address are stored in the first directory 90b.

Figure 33:
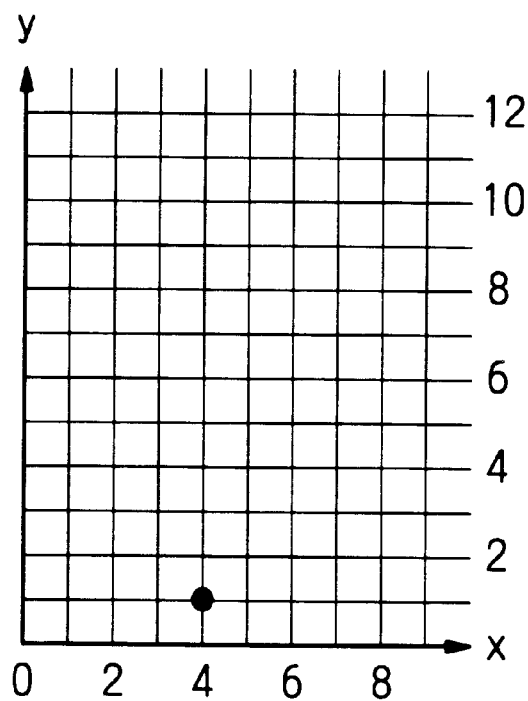
Figure 34:
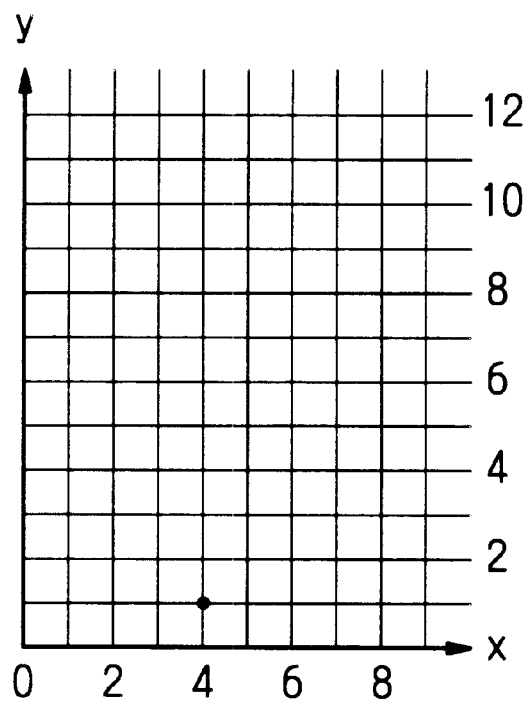
Figure 35:
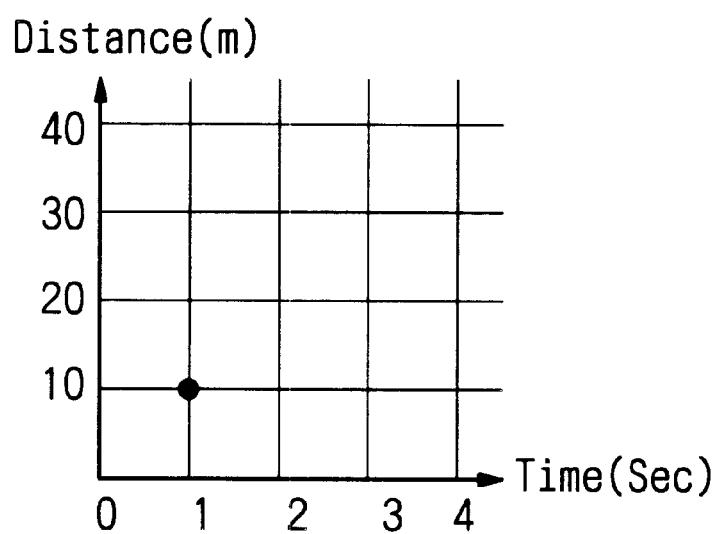
Figure 36:
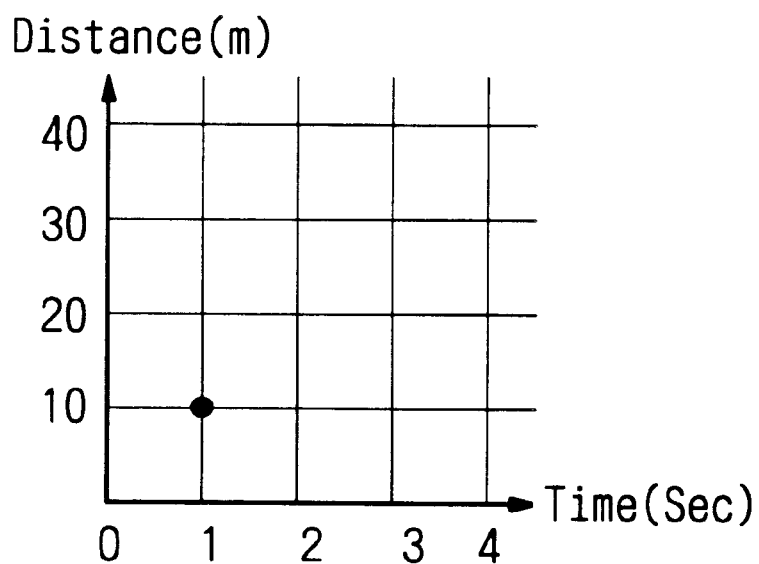
Figure 37:
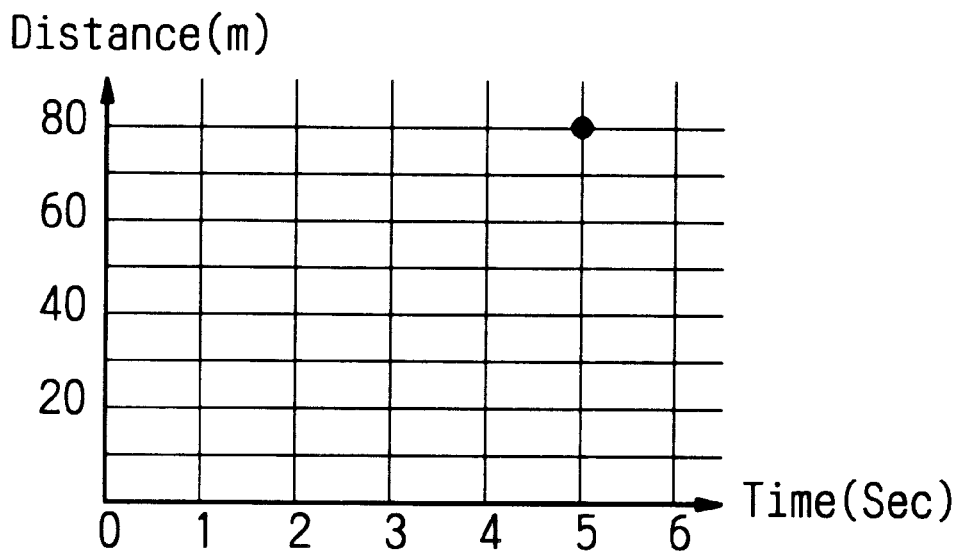
Figure 38:
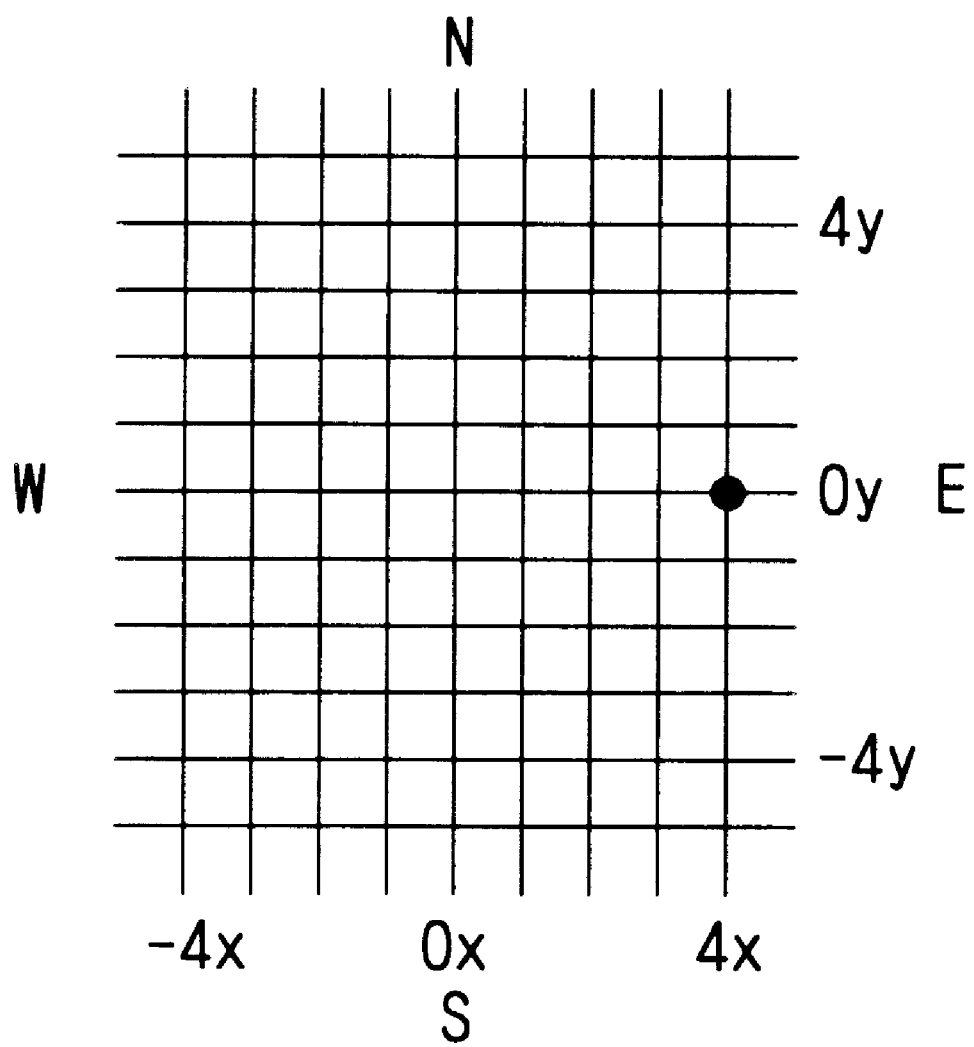

The point F is indicated by a dot in FIG. 33 and represented by coordinates (x4, y1) in terms of position data on the map data. As for position data based on GPS and autonomous navigation, the point E is indicated by a dot in FIG. 34 and represented by coordinates (x4, y1). FIG. 35 shows a dot representative of speed data in terms of coordinates. As shown, the dot indicates that x is 1 second and y is 10 meters, i.e., the vehicle speed is 10 meters per second. A dot shown in FIG. 36 shows that a split time between the two points E and F is 1 second, i.e., x is 1 second and A is 10 meters. Also, a dot shown in FIG. 37 shows that a total time between the start point A and the destination F is 5 seconds because x is 5 seconds and y is 80 meters. Further, a dot shown in FIG. 38 shows that direction data is (4x, 0y) in terms of coordinates because the wheels are now directed east. At the point F, time data indicative of 1 o'clock, 0 minute and 5 seconds is generated and written to the data area 92 of the hard disk 38.

By the above procedure, nine different kinds of data relating the route between the start point A and the destination F are written to the hard disk 38 together with control data. These data are used to guide the operator of the vehicle, as will be described specifically later.

In the above embodiment, various kinds of data are collected and written to the hard disk 38 every second. Alternatively, such data may be collected and written to the hard disk 38 at intervals shorter than 1 second when the direction of travel is expected to change often due to, e.g., many corners, or at intervals longer than 1 second when the direction of travel is expected to change little, e.g., when the route is straight. Control over such intervals may be assigned to a program stored in the ROM of the controller 20.

How the data stored in the hard disk 38 are used to guide the operator of the vehicle will be described hereinafter. Assume that the operator of the vehicle intends to return from the point F to the point A along the same route by way of example. First, the operator manipulates the buttons of the operation 40 in order to input information indicative of the travel from the point F (now a start point) to the point A (now a destination). This information is transferred from the operation 40 to the controller 20. In response, the controller 20 determines whether or not the vehicle has run the route between the points F and A in the past, referencing the titles 90a of the control data area 90 of the hard disk 38. In this specific case, the controller 20 determines that a title showing the start point A and destination F is stored in the first title portion 90a (TITLE #1). In addition, the controller 20 sees that the title newly entered on the operation 40 is opposite in direction to the title existing in the hard disk 38. That is, the controller 20 determines that various kinds of data stored in the hard disk 38 under the above title can be used to guide the operator from the point F to the point A.

Subsequently, the controller 20 references the first directory (DIRECTORY #1) in order to determine the addresses where the data relating to the route between the points F and A are stored. The controller 20 reads such data out of the addresses of the data area 92 of the hard disk 38 indicated by the first directory 90b, and temporarily writes them in its the RAM. Then, the controller 20 reads out of the CD-ROM 32 the map data including the position data written to the RAM and position data around them. The controller 20 causes the display 26 to display the map data via the display controller 24.

Thereafter, the controller 20 generates, based on the position data of the point F stored in its RAM, data for displaying a guide mark for guiding the operator at a position on the map data coincident with the point F. This data is sent from the controller 20 to the display 26 via the display controller 24. As a result, the guide mark appears on the display 26 over the map data at the position coincident with the point F. Further, the controller 20 determines the current position of the vehicle on the basis of data received via the GPS receiver 10. In addition, the controller 20 generates data for displaying a current position mark at the above position derived from the GPS data. This data is also sent to the display 26 via the display controller 24 with the result that the current position mark also appears on the display 26 over the map data.

If the guide mark and current position mark appearing on the display 26 are not coincident, the operator drives the vehicle until the two marks meet with each other. Then, the operator presses the button of the operation 40 assigned to a guide start command.

In response, the controller 20 sequentially references the position data, speed data, distance data and other data stored in its RAM, the oldest data first with respect to time by way of example. The controller 20 generates data for moving the guide mark to, e.g., the point E 10 meters ahead of the point F and sends it to the display 26 via the display controller 24. As a result, the guide mark now appears at the point E on the display 26 over the map data. At this instant, the vehicle is still located at the point F, and the current position mark is also located at the position on the display 26 coincident with the point F.

Assume that the vehicle runs from the point F to the point A by way of the points E, D, C and B. Then, the controller 20 sequentially references the position data, speed data, distance data and other data stored in its RAM, the oldest data first. The controller 20 generates, based on such data, data for positioning the guide mark such that the distance between the guide mark and the current position mark is 10 meters. This data is fed from the controller 20 to the display 26. Because the vehicle finally reaches the point or destination A, the guide mark and current position mark finally coincide with each other. The positions of the vehicle other than the start point F are determined on the basis of the GPS data and autonomous navigation data. When the current position mark is deviated from the guide mark by more than a preselected value, the controller 20 drives the speech output 22 so as to produce a suitable alert message.

The above specific operation has concentrated on the reverse travel of the vehicle from the point F to the point A along the same route. The forward travel from the point A to the point F is essentially identical with the reverse travel except that the various kinds of data are used in the forward order with respect to time, and will not be described specifically in order to avoid redundancy.

As stated above, in the illustrative embodiment, data relating to various sections are sequentially written to the hard disk 38 and used to guide the operator of the vehicle through the above sections. This allows the operator to accurately drive the vehicle along any desired route without fail.

Referring to FIG. 40, an alternative embodiment of the navigation system in accordance with the present invention will be described. This embodiment differs from the previous embodiment in that it is implemented as a handy navigation system to be carried by a person, as distinguished from the on-board navigation system. The handy navigation system is capable of storing various kinds of data necessary for a person to walk between two remote points in a hard disk, and guiding the person along the same route back and forth by use of the stored data.

As shown in FIG. 40, the alternative embodiment differs from the previous embodiment in that a pedometric sensor 50 responsive to the distance of a walk is substituted for the odometric sensor 14, in that an azimuth sensor 52 is substituted for the azimuth sensor 16, in that a controller 54 is substituted for the controller 20, and in that signal lines 160 and 162 are substituted for the signal lines 114 and 116, respectively. In FIG. 40, the same structural elements as the elements shown in FIG. 1 are designated by the same reference numerals, and a detailed description thereof will not be made in order to avoid redundancy.

In this embodiment, the pedometric sensor or alternative distance sensor 50 is of the type having a ball magnet and a switch. Every time a person carrying the handy navigation system, i.e., the user makes a step forward, the ball magnet of the sensor 50 turns on the switch and causes a single pulse to be output. Pulses output from the sensor 50 are fed to the controller 54 via the signal line 160. The controller 54 includes a calculating circuit for counting the pulses, i.e., the number of steps made and calculating a distance walked by multiplying the count and a preselected coefficient. The coefficient may be determined by any one of the following three different methods.

A first method is to determine the number of steps which the user made over a distance between landmarks or two points on a map stored in the CD-ROM 32 and which is known beforehand. The coefficient is produced by dividing the above distance by the number of steps. The coefficient is written to a ROM included in the controller 54 beforehand.

A second method is to store a distance between landmarks or two points on the map of the CD-ROM 32 and which is known beforehand in the ROM of the controller 54. The coefficient is also produced by dividing the distance by the number of steps made over the above distance. The coefficient is written to a RAM also included in the controller 54.

A third method is to determine a distance between two points which the user walked on the basis of GPS data. The coefficient is produced by dividing the distance by the number of steps made over the above distance. The coefficient is also written to the RAM of the controller 54.

Of course, the circuit system implementing the pedometric sensor 50 and using a ball magnet and a switch may be replaced with a circuit system using a pressure-sensitive semiconductor, as the case may be.

In the illustrative embodiment, the azimuth sensor 52 is implemented by a fluxgate sensor having a troidal ferrite core, an exciting coil mounted on the core, and a pair of sensing coils perpendicular to each other. The sensing coils output a variation in the magnetic flux of the exciting coil ascribable to an outside magnetic field. The output of the fluxgate sensor, i.e., a phase difference signal is fed to the controller 54 via the signal line 162. In response, the controller 54 determines a direction in which the user carrying the system is walking. In addition, the controller 54 has a function of producing the track of walk from the phase difference signal and the distance which the user has walked, i.e., the autonomous navigation function.

The controller 54 has, in addition to the functions of the controller 20 shown in FIG. 1, the CPU, the ROM storing a program for executing various kinds of processing, and the RAM playing the role of a work area.

The controller 54 controls the various functions of the system on the basis of data fed from the buttons of the operation 40 via the control line 148, GPS data fed from the GPS receiver 10 via the signal line 110, VICS data fed from the VICS receiver 12 via the signal line 112, data fed from the pedometric sensor 50 via the signal line 160, data fed from the azimuth sensor 52 via the signal line 162, data fed from the timepiece 18 via the signal line 120, data fed from the reproduction 30 via the connection 28, and data fed from the record/reproduction 36 via the connection 34. The controller 54 delivers, based on such data, control data and signal data to the speech output 22 via the signal line 122, to the display controller 24 via the signal line 124 and control line 126, to the connection 28 via the control line 132, and to the connection 34 via the control line 140.

A procedures for writing data necessary for a walk and output from the various sections of the system and a procedure for guiding the user between two points by using the above date are basically identical with the procedures of the previous embodiment and will not be described in order to avoid redundancy.

In this embodiment, data relating to various sections which the user carrying the navigation system walked are written to the hard disk 38. The user can therefore be accurately guided along a desired route on the basis of the data stored in the hard disk 38. It is to be noted that the data stored in the hard disk 38 in the previous embodiment and the data stored therein in this embodiment are replaceable with each other, if desired.

Referring to FIG. 41, another alternative embodiment of the present invention will be described. As shown, this embodiment is similar to the embodiment shown in FIG. 40 except that a controller 56 is substituted for the controller 54, that an operation 41 is substituted for the operation 40, and that a radio transmitter/receiver 58 and an antenna 72 are additionally included. With this configuration, the embodiment is capable of selectively transmitting the guide route data stored in its hard disk 38 to the hard disk 38 of another or remote system having the same configuration, or receiving guide route data from the hard disk 38 of the remote system and writing them in its hard disk 38. This embodiment is therefore capable of guiding the user of the system along a desired route based on the data stored in the hard disk 38 of the remote system.

In FIG. 41, the same structural elements as the elements shown in FIG. 40 are designated by the same reference numerals, and a detailed description thereof will not be made in order to avoid redundancy. While this embodiment is based on the embodiment shown in FIG. 40, it may be based on the embodiment shown in FIG. 1, if desired.

As shown in FIG. 41, the controller 56 and radio transmitter/receiver 56 are connected together by a signal line 170 and a control line 172. The transmitter/receiver 58 and antenna 72 are connected together by a signal line 184.

FIG. 42 shows a specific configuration of the transmitter/receiver 58. As shown, the transmitter/receiver 58 is made up of a switching 60, a parallel-to-serial (P/S) converter 62, a serial-to-parallel (S/P) converter 64, a frequency modulator 66, a n FM demodulator 68, and a duplexer 70.

The switching 60 has an input/output 170 and an input 172 respectively connected to the input/output 170 and output 172 of the controller 56. In the specific configuration, when a (logical) ONE appears on the control line 172, the switching 60 connects the signal line 170 to a signal line 174 while disconnecting the signal line 170 from a signal line 176. When a (logical) ZERO appears on the control line 172, the switching 60 connects the signal line 170 to the signal line 176 while disconnecting the signal line 170 from the signal line 174. In this sense, the switching 60 plays the role of a data selector.

In the above configuration, when a ONE appears on the control line 172, eight-bit parallel data fed from the controller 56 via the signal line 170 appear on the output 174 of the switching 60. When a ZERO appears on the control line 172, eight-bit parallel data fed from the S/P converter 64 via the signal line 176 appear on the output 170 of the switching 60. The output 174 and input 176 of the switching 60 are respectively connected to the input of the P/S converter 62 and the output of the S/P converter 64.

Basically, the eight-bit parallel data fed from the controller 56 via the signal line 170 include guide data read out of the hard disk 38 by the controller 56 and relating to a desired section designated on the operation 41, and data representative of an identification (ID) number assigned to the other or remote station to which the guide data should be sent. Likewise, the eight-bit parallel data fed from the SIP converter 64 via the signal line 176 basically include guide data read out of the hard disk 38 of the other system and relating to a desired section, and an ID number assigned to a system for which the guide data are meant. If the received data representative of an ID number is coincident with the data representative of the ID number assigned to the above system, the controller 56 writes the received guide data in the hard disk 38 and allows them to be used for a guiding purpose. In the illustrative embodiment, the data representative of the ID number assigned to the system is stored in the ROM of the controller 56 beforehand.

The P/S converter 62 converts the eight-bit parallel applied to its input 174 to serial data and delivers the serial data to the frequency modulator 66 via its output 178. A control signal for controlling the P/S conversion is fed from the controller 56 to the P/S converter 62 via the control line 172. The SIP converter 64 transforms serial data fed from the FM demodulator 68 via the signal line 186 to eight-bit parallel data and delivers the parallel data to the switching 60 via its output 176. This is also controlled by a control signal fed from the controller 56 via the control line 172.

The frequency modulator 66 executes frequency modulation with the serial data received from the P/S converter 62 via the signal line 178. As a result, an FM signal appears on the output 180 of the frequency modulator 66 which is connected to the duplexer 70. Of course, the FM system is only a specific form of a modulation system applicable to the illustrative embodiment. The FM demodulator 68 demodulates an FM signal received from the duplexer 70 via the signal line 184 and produces a corresponding demodulated signal on its output 186. The output 186 is connected to the input 186 of the SIP converter 64.

The duplexer 70 plays the role of a filter for transferring the FM signal applied thereto from the frequency modulator 66 via the signal line 180 to the output 182, or for transferring the FM signal applied thereto from the antenna 72 via the signal line 182 to an output 184. The output 184 is connected to the input 184 of the FM demodulator 68.

It is to be noted that the configuration of the transmitter/receiver 58 shown in FIG. 42 may be replaced with any other suitable configuration so long as it is capable of transmitting and receiving data.

The operation 41 has the following two functions in addition to the functions of the operation 40 shown in FIG. 40. One function is to allow the operator to input on buttons the ID number of the other station to which guide route data should be sent. The other function is to allow the operator to input on another button a send command for sending guide route data relating to a desired section. Again, the system using such buttons may be replaced with a system using a mouse or a touch panel, if desired.

The controller 56 includes a CPU, a ROM storing a program for executing various kinds of processing, and a RAM or work area, and also has the functions of the controller 54 shown in FIG. 40.

The controller 56 controls the various functions of the system on the basis of data fed from the buttons of the operation 41 via the control line 148, GPS data fed from the GPS receiver 10 via the signal line 110, VICS data fed from the VICS receiver 12 via the signal line 112, data fed from the pedometric sensor 50 via the signal line 160, data fed from the azimuth sensor 52 via the signal line 162, data fed from the timepiece 18 via the signal line 120, data fed from the reproduction 30 via the connection 28, data fed from the record/reproduction 36 via the connection 34, and data fed from the transmitter/receiver 58 via the signal line 170. The controller 56 delivers, based on such data, control data and signal data to the speech output 22 via the signal line 122, to the display controller 24 via the signal line 124 and control line 126, to the connection 28 via the control line 132, to the connection 34 via the control line 140 and signal line 142, and to the transmitter/receiver 58 via the control line 172 and signal line 170.

A procedure for writing the data necessary for a walk and output from the various sections of the system in the hard disk or storage 38 and a procedure for guiding the user between two points are executed basically in the same as in the previous embodiment and will not be described in order to avoid redundancy.

Assume that guide route data should be sent from the system shown in FIG. 41 to the other system or station having the same configuration. First, the user enters an ID number assigned to the other station on the buttons of the operation 41. The resulting data representative of the above ID number is fed to the controller 56 via the signal line 148 and written to the RAM of the controller 56. Then, the user designates the start point and destination of a desired section on the other buttons of the operation 41. The resulting data are also written to the RAM of the controller 56 via the signal line 148. In response, the controller 56 accesses the hard disk 38 to see if a title designated by the input data is present in the disk 38 or not.

If the above title is present in the hard disk 38, the controller 56 reads various kinds of data covered by the title out of the designated area of the disk 48 and then writes them in its RAM. Subsequently, in this embodiment, the controller 56 sequentially reads the ID number data indicative of the other station, title data and guide data out of its RAM in this sequence, and delivers them to the transmitter/receiver 58. The transmitter/receiver 58 executes frequency modulation with the input data and thereby produces an FM signal. The FM signal is sent to the other station via the antenna 72 in the form of a radio wave.

Assume that the system receives guide route data from the other system having the same configuration. Then, an FM signal received via the antenna 72 is fed to the controller 56 via the transmitter/receiver 58. The controller 56 determines whether or not an ID number included in the received data is identical with the ID number stored in its ROM. If the received ID number is different from the stored ID number, the controller 56 ignores data following the received ID number. If the two ID numbers are identical, the controller 56 writes the data following the received ID number in its RAM.

Subsequently, the controller 56 reads a title out of its RAM and writes it in the preselected title area of the hard disk 38, and then reads guide data out of the RAM and writes them in the preselected data area of the disk 38. Finally, the controller 56 writes the addresses of the disk 38 having stored the guide data in the directory area of the disk 38.

As stated above, the system shown in FIG. 41 allows data stored in its hard disk 38 and relating to various sections to be sent to and written to the hard disk 38 of a remote station. The remote station can therefore guide the user along a desired route by using the received data. In addition, the system of FIG. 41 is capable of receiving guide data relating to various sections from the hard disk 38 of the remote station, and thereby guiding the user by use of the received data. For example, the operator of a delivery truck is capable of receiving guide data relating to various sections from a navigation system situated at a delivery center via the on-board navigation system. It follows that even an untrained person can deliver goods to various destinations without any any error or waste.

In summary, it will be seen that the present invention provides a navigation system including a storage for storing data relating to various sections, and therefore capable of guiding the user of the system along various routes by using the stored data. The user can therefore accurately move the various routes without fail.

The entire disclosure of Japanese patent application No. 18213/1997 filed on Jan. 31, 1997 including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A navigation system carried on a first mobile body, comprising:
    a time generating means for consecutively generating time data representative of time;
    a first storing means for storing start position data of a start point and destination data of a destination as title data on a movement of the first mobile body, wherein time data is generated at a desired time interval while the first mobile body moves from the start point to the destination, and position data of a position and direction of the first mobile body at the time represented by the time data;
    a second storing means for storing bi-dimensional position data on a map;
    an operating means, wherein said operating means includes:
        a time interval inputting means to enable an operator to define the desired time interval at which the position data of the moving mobile body is stored, and
        a first position inputting means to enable the operator to define start point and destination positions for the first mobile body so as to produce said first start position and destination data; and
    a control means which is operative in response to both of said operating and time generating means for controlling said first and second storing means.

2. The system of claim 1, wherein said control means further includes:
    a time selecting means for receiving consecutive time data from said time generating means, along with the defined time interval from said time interval inputting means and the time data at the start point of the first mobile body, and for storing that time interval data defined as between the received time data at the start point from the consecutive time data to thereby consecutively output taken-in time data at the defined time interval;
    a satellite navigation position detecting means
        for consecutively receiving radio waves from a plurality of GPS satellites, wherein each of the radio waves is a modulated signal resulting from a carrier wave modulated with GPS data in a corresponding one of said plurality of GPS satellites,
        for consecutively demodulating the received signals to produce demodulated signals, for receiving the time data at the start point of the first mobile body,
        for storing the demodulated signal corresponding to the time of the received time data at the start point from the consecutively demodulated signals,
        for determining a distance between each of the satellites and the first mobile body on the basis of a propagation time of the radio wave from the stored demodulated signals, and for providing the start position data of the first mobile body at the start point from the determined distance; and an autonomous navigation position detecting means for sensing a distance and an azimuth of the first mobile body to provide first sensor data and second sensor data for the receiving time data following the time data at the start point of the first mobile body from said time generating means, for consecutively accepting the first and second sensor, for producing distance data based on the movement of the first mobile body from the first sensor data, and azimuth data of the first mobile body from the second sensor data, for determining a track of movement of the first mobile body on the basis of the distance data and the azimuth data, and for adding the track of movement to the start position data to thereby output moving position data of the first mobile body representative of a position to which the first mobile body have moved.

3. The system of claim 2, wherein said control means consecutively receives the time data from said time generating means, the selected time data from said time selecting means at the defined time interval, and the first start position data and the first destination data from said first position inputting means, stores the first start position data and the first destination data in said first storing means, as well as the time data at the first start point of the first mobile body from the time data consecutively received from said time generating means, transfers the first start point time data to said time selecting means and said satellite navigation position detecting means, subsequently receives the first start position data at the first starting point outputted from said satellite navigation position detecting means, stores the received first start position data in said first storing means, obtains the position data substantially close to the received first start position data from the bi-dimensional position data stored in said second storing means, stores the obtained position data in said first storing means as second start position data, and subsequently receives time after data corresponding to a time following the time represented by the first start point time data at the defined time interval from said time selecting means, stores the received time after data in said first storing means, transfers the time after data to said autonomous navigation position detecting means, receives first moving position data and the first azimuth data at a moving point next to the first start point of the first start position data outputted from said autonomous navigation position detecting means in response to the time after data, stores the received first moving position data and the first azimuth data in said first storing means, obtains position data substantially close to the received first moving position data from the bi-dimensional position data stored in said second storing means, and stores the obtained position data in said first storing means as second moving position data.

4. The system of claim 3, further comprising:

a radio transmitting means for receiving data to be transmitted from said control means, for forming a signal modulated with the data to be transmitted, and for transmitting a resultant modulated signal;

wherein said operating means further includes:

an identification inputting means for allowing the operator to input an identification representative of another navigation system having the same structure as the earlier-said system and carried by a second mobile body, other than the first mobile body, to which guide route data stored in said first storing means are to be sent, the guide route data including the title data, time data, position data and azimuth data, and a second position inputting means for allowing the operator to input second start position data representative of a second start point and second destination data representative of a second destination defining a section of the guide route data to be sent to said other navigation system.

5. The system of claim 4, wherein said control means is operative in response to an operation of said second position inputting means to receive the identification representative of said other navigation system from said identification input means and the position data representative of the second start point and the second destination from said second position inputting means, to access said first storing means to determine whether or not the title data corresponding to the received position data exist in said first storing means, determine, if the second start position data are identical with the first start position data or the first destination data and if the second destination data are identical with the first destination data or the first start position data, the guide route data corresponding to the title data exist in said first storing means, read out the determine d guide route data including the title data, time data, position data and first azimuth data from said first storing means, form the data to be transmitted including the read-out guide route data and the identification of the second mobile body provided from said identification inputting means, and transfer the data to be transmitted to said radio transmitting means.

6. A system in accordance with claim 2, wherein said control means further includes data generating means for generating, based on said distance data corresponding to a time represented by said time data selected by said time selecting means and output from said autonomous navigation position detecting means, data representative of a distance of movement, data representative of a period of time needed for said distance, speed data, lap time data, split time data, and total time data, said control means feeding and storing said data representative of the distance of movement and the period of time, respectively, said speed data, said lap time data, said split time data, and said total time data to and in said first storing means.

7. A system in accordance with claim 1, wherein said operating means further comprises a guide position inputting means for allowing the operator to input position data of a start point and a destination for route guide, said control means accessing, on receiving third position data representative of a position of a third start point and a third destination data representative of a third destination for route guide from said guide position inputting means, said first storing means to determine whether or not the title data based upon said third start position data and said third destination data exist in said first storing means, determining, if the third start position data are identical with the first start position data and if the third destination data are identical with the first destination data, that the guide route data corresponding to the title exist in said first storing means, and reading said position data based on the movement of the first mobile body and the first azimuth data out of said first storing means in order of time represented by said time data stored in said first storing means and using said position data and said first azimuth data read-out for route guide, and determining, if the third start position data are identical with the first destination data and if the third destination data are identical with the first start position data, that data corresponding to the title exist in said first storing means, and reading said position data based on the movement of the mobile body and the first azimuth data out of said first storing means, oldest ones first with respect to time represented by said time data stored in said first storing means, and using said position data and the first azimuth data for route guide.

8. A system in accordance with claim 7, further comprising an alert displaying means for displaying an alert in response to an alert signal, said control means further controlling said alert displaying means and feeding said alert signal to said alert displaying means when a current position of the first mobile body is deviated from a guide position for the route guide by more than a preselected distance.

9. A system in accordance with claim 1, wherein said first storing means is selected from a group consisting of a hard disk, a magnetooptical disk and a semiconductor memory.

10. A system in accordance with claim 4, further comprising a radio receiving means for receiving the resulting modulated signal transmitted from a radio transmitting means included in said other navigation system and corresponding to said radio transmitting means, and for demodulating the resulting modulated signal received.

* * * * *